United States Patent
Nagamori et al.

(10) Patent No.: US 11,271,219 B2
(45) Date of Patent: Mar. 8, 2022

(54) ELECTRODE CATALYST, COMPOSITION FOR FORMING GAS DIFFUSION ELECTRODE, GAS DIFFUSION ELECTRODE, MEMBRANE ELECTRODE ASSEMBLY AND FUEL CELL STACK

(71) Applicant: N.E. CHEMCAT CORPORATION, Tokyo (JP)

(72) Inventors: Kiyotaka Nagamori, Tokyo (JP); Yoko Nakamura, Tokyo (JP); Tomoteru Mizusaki, Tokyo (JP); Yasuhiro Seki, Tokyo (JP); Hiroshi Igarashi, Tokyo (JP)

(73) Assignee: N.E. CHEMCAT CORPORATION, Tokyo (JP)

( * ) Notice: Subject to any disclaimer, the term of this patent is extended or adjusted under 35 U.S.C. 154(b) by 0 days.

(21) Appl. No.: 17/052,693

(22) PCT Filed: May 15, 2019

(86) PCT No.: PCT/JP2019/019267
§ 371 (c)(1),
(2) Date: Nov. 3, 2020

(87) PCT Pub. No.: WO2019/221168
PCT Pub. Date: Nov. 21, 2019

(65) Prior Publication Data
US 2021/0184228 A1    Jun. 17, 2021

(30) Foreign Application Priority Data

May 15, 2018 (JP) .............................. JP2018-093537
Nov. 8, 2018 (JP) .............................. JP2018-210970

(51) Int. Cl.
*H01M 4/92* (2006.01)
*H01M 4/86* (2006.01)
(Continued)

(52) U.S. Cl.
CPC ......... *H01M 4/921* (2013.01); *H01M 4/8626* (2013.01); *H01M 4/8657* (2013.01);
(Continued)

(58) Field of Classification Search
CPC .. H01M 4/921; H01M 4/8626; H01M 4/8657; H01M 4/8807; H01M 4/926; H01M 8/1004; H01M 8/1018
See application file for complete search history.

(56) References Cited

U.S. PATENT DOCUMENTS

2007/0031722 A1    2/2007   Adzic et al.
2014/0287344 A1    9/2014   Suzue et al.
(Continued)

FOREIGN PATENT DOCUMENTS

CA    2 661 488 A1    3/2008
JP    2013-109856 A   6/2013
(Continued)

OTHER PUBLICATIONS

International Search Report dated Aug. 6, 2019, issued in counterpart International Application No. PCT/JP2019/019267. (2 pages).
(Continued)

*Primary Examiner* — Helen Oi K Conley
(74) *Attorney, Agent, or Firm* — Westerman, Hattori, Daniels & Adrian, LLP

(57) ABSTRACT

Provide an electrode catalyst with excellent catalytic activity that can contribute to cost reduction of PEFC. The electrode catalyst includes a hollow carbon carrier with mesopores with a pore size of 2 to 50 nm and a catalyst particle supported on the carrier. The catalyst particle is supported on both inside and outside the mesopores of the carrier, and have a core portion formed on the carrier and a shell portion covering at least a part of the surface of the core portion. Pd is included in the core portion, and Pt is included in the shell
(Continued)

portion, and when the analysis of the particle size distribution of the catalyst particles using the three dimensional reconstructed image obtained by electron beam tomography (electron tomography) measurement using an STEM is performed, the ratio of the catalyst particles supported inside the mesopore is 50% or more.

10 Claims, 20 Drawing Sheets

(51) Int. Cl.
*H01M 4/88* (2006.01)
*H01M 8/1004* (2016.01)
*H01M 8/1018* (2016.01)
*H01M 4/02* (2006.01)
*H01M 8/10* (2016.01)

(52) U.S. Cl.
CPC ......... *H01M 4/8807* (2013.01); *H01M 4/926* (2013.01); *H01M 8/1004* (2013.01); *H01M 8/1018* (2013.01); *H01M 2004/021* (2013.01); *H01M 2008/1095* (2013.01); *H01M 2300/0082* (2013.01)

(56) References Cited

U.S. PATENT DOCUMENTS

| | | |
|---|---|---|
| 2016/0064744 A1 | 3/2016 | Mashio et al. |
| 2016/0072134 A1 | 3/2016 | Ohma et al. |
| 2017/0194652 A1 | 7/2017 | Iijima et al. |
| 2018/0123154 A1 | 3/2018 | Furukawa et al. |
| 2019/0083957 A1 | 3/2019 | Okui et al. |

FOREIGN PATENT DOCUMENTS

| | | |
|---|---|---|
| JP | 2017-21991 A | 1/2017 |
| JP | 2017-212217 A | 11/2017 |
| WO | 2014/175106 A1 | 10/2014 |
| WO | 2015/141810 A1 | 9/2015 |
| WO | 2016/063968 A1 | 4/2016 |
| WO | 2016/152447 A1 | 9/2016 |
| WO | 2017/154359 A1 | 9/2017 |

OTHER PUBLICATIONS

Office Action dated Oct. 27, 2021, issued in counterpart CA Application No. 3,099,779. (7 pages).

100 # ELECTRODE CATALYST, COMPOSITION FOR FORMING GAS DIFFUSION ELECTRODE, GAS DIFFUSION ELECTRODE, MEMBRANE ELECTRODE ASSEMBLY AND FUEL CELL STACK

TECHNICAL FIELD

The present invention relates to an electrode catalyst having a core-shell structure. More particularly, the present invention relates to an electrode catalyst suitably used for a gas diffusion electrode, and more particularly, to an electrode catalyst suitably used for a gas diffusion electrode of a fuel cell.

Further, the present invention relates to a composition for forming gas diffusion electrode, a membrane electrode assembly, and a fuel cell stack comprising the above-described electrode catalyst particles.

BACKGROUND OF THE INVENTION

Polymer electrolyte fuel cells (Polymer Electrolyte Fuel Cell: hereinafter referred to as "PEFC" as required) are being researched and developed as power sources for fuel cell vehicles and household cogeneration systems.

A noble metal catalyst composed of noble metal particles of a platinum group element such as platinum (Pt) is used for a catalyst used for a gas diffusion electrode of a PEFC.

For example, as a typical conventional catalyst, a "Pt supported carbon catalyst" (hereinafter, referred to as "Pt/C catalyst" as needed) is known which is a powder of catalyst particles in which Pt fine particles are supported on conductive carbon powder.

Among the production cost of PEFC, the ratio of the cost occupied by noble metal catalysts such as Pt is large, which has become a problem toward the cost reduction of PEFC and the popularization of PEFC.

Among these research and development, in order to reduce the amount of platinum used, conventionally, a powder of catalyst particles (hereinafter, referred to as "core-shell catalyst particles" if necessary) having a core-shell structure formed of a core portion made of a non-platinum element and a shell portion made of Pt (hereinafter, referred to as "core-shell catalyst particles") has been studied, and a large number of reports have been made.

For example, Patent Document 1 discloses a particle composite (corresponding to the core-shell catalyst particles) having a structure in which palladium (Pd) or a Pd alloy (corresponding to the core portion) is coated by an atomic thin layer of Pt atoms (corresponding to the shell portion). Further, in Patent Document 1, there is described as an example, a core-shell catalyst particle having a structure in which the core portion is Pd particles and the shell portion is a layer comprising Pt.

On the other hand, as a carrier of an electrode catalyst, there are hollow carbon having many pores inside and solid carbon having fewer pores inside compared with the hollow carbon, and studies have been made for improving performance utilizing the respective characteristics thereof.

For example, Patent Document 2 discloses an example of an investigation in which hollow carbon is adopted as a carrier. In addition, Patent Document 3 discloses an example of an investigation in which solid carbon is adopted as a carrier. For example, in Patent Document 2, as shown in FIG. 11, a configuration of an electrode catalyst 200 is disclosed in which a pore volume and a pore distribution of a pore (primary vacancy, mesopore) P220 having a pore diameter of 4 to 20 nm of a porous carrier (hollow carbon) 220 having an average particle size of 20 to 100 nm are controlled in predetermined ranges, and a catalyst particle 230 is supported in a primary vacancy (mesopore) P220 of the carrier 220.

In Patent Document 2, it is mentioned that, thereby, adsorption of the polymer electrolyte on the surface of the catalyst particles 230 existing in the primary vacancy (mesopore) P220 is prevented, and the gas transportability can be sufficiently secured while preventing the effective reaction surface area of the catalyst from being lowered. As a result, it has been mentioned that a catalyst layer for a fuel cell exhibiting excellent power generation performance can be provided in which the activity per catalyst weight is improved even when the amount of catalyst is reduced.

Further, for example, Patent Document 3 discloses an electrode catalyst for a fuel cell having a solid carbon carrier 222 and a catalyst particle 232 containing an alloy of platinum and cobalt supported on the carrier 222 as shown in FIG. 12. The electrode catalyst has a molar ratio of platinum to cobalt of 4 to 11:1 in the alloy and is acid treated at 70 to 90° C.

In Patent Document 3, when a PtCo alloy is supported on a hollow carbon carrier, a part of PtCo alloy is encompassed inside the hollow carbon carrier, and even if an acid treatment for suppressing elution of Co is performed, it is difficult to sufficiently treat PtCo alloy present inside the carrier, and as a result, Co is easily eluted from PtCo alloy present inside the carrier, and it has been viewed as a problem.

Therefore, in Patent Document 3, it is mentioned that, by using a solid carbon carrier instead of a hollow carbon carrier, it is possible to avoid inclusion of a PtCo alloy inside the carrier. In addition, thus, it is disclosed that it becomes possible to sufficiently acid-treat the PtCo alloy and to suppress the elution of Co. It is mentioned that it is possible to balance both the initial performance and durability performance of the fuel cell, as a result.

Here, in Patent Document 3, the solid carbon is defined as follows.

Namely, it is referred in Patent Document 3 that the solid carbon is a carbon having fewer voids inside carbon as compared with a hollow carbon, and specifically, a carbon in which a ratio (t-Pot surface area/BET surface area) of BET surface area determined by $N_2$ adsorption to outer surface area by t-Pot (surface area outside particle was calculated from particle size) is 40% or more.

Note that the "t-Pot surface area" described in Patent Document 3 is understood to indicate, for example, "t-plot (t-plot) surface area" described in the technical report "Analysis of Micropore Surface Area by t-plot Method" published on the internet by "MCEvatec Co., Ltd" on Feb. 1, 2019. The analysis of the micropore surface area by t-plot method is one of the methods to analyze from the adsorption isotherm (adsorption temperature: 77K) of nitrogen. This method is a method to compare and convert the data of adsorption isotherm with the standard isotherm, and to graphe the relationship between thickness t of adsorption layer and adsorption amount. In addition to the fact that the specific surface area can be separated into the inside and the outside of the pores and quantified, the tendency of the pores can be known from the shape of the graph.

Examples of the solid carbon include, for example, the carbon described in Japanese Patent No. 4362116, and specifically, it is disclosed that a denka black (registered trademark) manufactured by Electrochemical Industry Co., Ltd. may be exemplified.

The applicant of the present patent application presents the following publications as a publication in which the known inventions described in the above publications are described.

PRIOR ART DOCUMENTS

Patent Document

[Patent Document 1] US Patent Application Publication No. 2007/31722
[Patent Document 2] JP Unexamined Patent Application Publication No. 2013-109856
[Patent Document 3] WO2016/063968 Publication

SUMMARY OF THE INVENTION

Problem to be Solved by the Invention

Toward the spread of PEFC, the core-shell catalyst is a powerful catalyst capable of reducing Pt usage, but further improvement in catalytic activity is required.

In particular, the present inventors have found that there has been no report so far of specifically synthesizing a highly active core-shell catalyst having a configuration in which a catalyst particle having a core-shell structure is supported more inside than outside a mesopore of a hollow carbon, and that there is still room for improvement for a core-shell catalyst.

The present invention was achieved in view of such technical circumstances, and it is an object of the present invention to provide an electrode catalyst (core-shell catalyst) having excellent catalytic activity capable of contributing to cost reduction of PEFC.

Further, it is an object of the present invention to provide a composition for forming gas diffusion electrode, a gas diffusion electrode, a membrane electrode assembly (MEA), and a fuel cell stack, which include the above-described electrode catalyst.

Means to Solve the Problems

The present inventors have intensively studied a configuration of an electrode catalyst in which a large number of catalyst particles having a core-shell structure are supported in a mesopore of a hollow carbon to realize further improvement in catalytic activity.

As a result, it has been found that the catalyst particles having a core-shell structure are supported on a carrier so as to satisfy the following conditions, which is effective for improving the catalytic activity, and thus the present invention was completed.

More specifically, the present invention is composed of the following technical matters.

That is, the present invention provides an electrode catalyst comprising a hollow carbon carrier having a mesopore of a pore size of 2 to 50 nm, and a catalyst particle supported on the carrier, wherein the catalyst particle has a core portion formed on the carrier, and a shell portion formed so as to cover at least a part of the surface of the core portion, Pd (0 valent) is included in the core portion, Pt (0 valent) is included in the shell portion, the catalyst particle is supported on both of inside and outside the mesopore of the carrier, and a ratio of the catalyst particles supported inside the mesopore is 50% or more when an analysis of a particle size distribution of the catalyst particles is performed by using a three dimensional reconstructed image obtained by an electron beam tomography (electron tomography) measurement using an STEM (scanning transmission electron microscopy).

By supporting the catalyst particles of the core-shell catalyst on the hollow carbon carrier so as to satisfy the condition that the ratio of the catalyst particles supported inside the mesopore is 50% or more as described above, the electrode catalyst of the present invention can exhibit an excellent catalytic activity capable of contributing to cost reduction of PEFC.

The detailed reason why the electrode catalyst of the present invention has excellent catalytic activity has not been sufficiently elucidated.

However, the present inventors consider as follows. Namely, in the core-shell catalyst in which the ratio of the catalyst particles supported inside the mesopore is 50% or more, there are many catalyst particles having a core-shell structure and a relatively small particle size with high activity inside the mesopore of the carrier as compared with a conventional electrode catalyst.

The catalyst particles supported inside the mesopores of such a carrier are supported on the carrier in a state in which these catalyst particles are hardly in direct contact with the polymer electrolyte present in the catalyst layer. Therefore, the electrode catalyst of the present invention reduces the decrease in catalytic activity due to poisoning of the Pt component and can exhibit an excellent catalytic activity when made into an electrode as compared with a conventional electrode catalyst. In addition, the electrode catalyst of the present invention also reduces the dissolution of the Pt component.

In addition, in the electrode catalyst of the present invention, from the viewpoint of more reliably obtaining the effect of the present invention, it is preferable that the ratio of the catalyst particles supported inside the mesopore is 80% or more when the analysis of the particle size distribution of the catalyst particles is performed by using the three dimensional reconstructed image obtained by electron beam tomography (electron tomography) measurement with an STEM (scanning transmission electron microscope).

Further, in the electrode catalyst of the present invention, from the viewpoint of further reliably obtaining the effect of the present invention, when the analysis of the particle size distribution of the catalyst particles is performed by using three-dimensional reconstructed images obtained by electron beam tomography (electron tomography) measurement with an STEM (scanning transmission electron microscopy), it is preferable that the conditions of the following the formula (1) and the formula (2) are simultaneously satisfied.

$$D1<D2 \tag{1}$$

$$(N1/N2)>1.0 \tag{2}$$

Here, in the formula (1) and the formula (2), D1 indicates a sphere equivalent diameter of particles exhibiting a maximum frequency among the catalyst particles supported inside the mesopores of the carrier. In the formula (1) and the formula (2), D2 indicates a sphere equivalent diameter of particles exhibiting a maximum frequency among the catalyst particles supported outside the mesopores of the carrier.

In addition, in the formula (1) and the formula (2), N1 indicates a frequency of particles exhibiting a maximum frequency among the catalyst particles supported inside the mesopores of the carrier. In the formula (1) and the formula (2), N2 indicates a frequency of particles exhibiting a maximum frequency among the catalyst particles supported outside the mesopores of the carrier.

By supporting the catalyst particle of the core-shell catalyst on the hollow carbon carrier so as to simultaneously satisfy the conditions of the formula (1) and the formula (2) described above, the electrode catalyst of the present invention can more reliably exhibit an excellent catalytic activity capable of contributing to cost reduction of PEFC.

Here, in the present invention, the "hollow carbon" is a carbon having many voids inside the carbon as compared with the solid carbon described above and is a conductive carbon having mesopores having a pore diameter of 2 to 50 nm as defined by IUPAC.

Further, in the electrode catalyst of the present invention, from the viewpoint of more reliably obtaining excellent catalytic activity, it is preferable that the core portion is composed of Pd (0 valent) and the shell portion is composed of Pt (0) in the catalyst particle. In this case, a Pd oxide may be included in the core portion and a Pt oxide may be included in the shell portion within a range in which the catalyst particle can exhibit excellent catalytic activity.

In addition, from the viewpoint of more reliably obtaining the effect of the present invention, in the electrode catalyst of the present invention, it is preferable that the hollow carbon carrier is a Ketjen black EC300J.

Further, in this case, it is preferable that the BET specific surface area (nitrogen adsorption specific surface area) of the hollow carbon carrier (Ketjen black EC300J) is 750 to 800 $m^2/g$.

Further, the present invention provides a composition for forming gas diffusion electrode, wherein the electrode catalyst of the present invention described above is contained.

Since the composition for forming gas diffusion electrode of the present invention includes the electrode catalyst of the present invention, it is possible to easily produce a gas diffusion electrode having excellent catalytic activity (polarization property) which can contribute to cost reduction of PEFC.

Further, the present invention provides a gas diffusion electrode containing the above-described electrode catalyst of the present invention.

The gas diffusion electrode of the present invention includes the electrode catalyst of the present invention. Therefore, it becomes easy to have a configuration having excellent catalytic activity (polarization property) which can contribute to cost reduction of PEFC.

Further, the present invention provides a membrane electrode assembly (MEA) including the above described gas diffusion electrode of the present invention.

Since the membrane electrode assembly (MEA) of the present invention includes the gas diffusion electrode of the present invention, it becomes easy to have a configuration having a cell property capable of contributing to cost reduction of PEFC.

Further, the present invention provides a fuel cell stack, in which the membrane electrode assembly (MEA) of the present invention described above is included.

According to the fuel cell stack of the present invention, since the membrane electrode assembly (MEA) of the present invention is included, it is easy to have a configuration having a cell property capable of contributing to cost reduction of PEFC.

Effect of the Invention

According to the present invention, there is provided an electrode catalyst having excellent catalytic activity capable of contributing to cost reduction of PEFC.

Further, according to the present invention, there is provided a composition for forming gas diffusion electrode, a gas diffusion electrode, a membrane electrode assembly (MEA), and a fuel cell stack, each of which includes such an electrode catalyst.

DETAILED DESCRIPTION OF THE INVENTION

Hereinafter, with reference to figures as appropriate, a suitable embodiment of the present invention is explained in detail.

<Membrane Electrode Assembly (MEA)>

Figure 1:
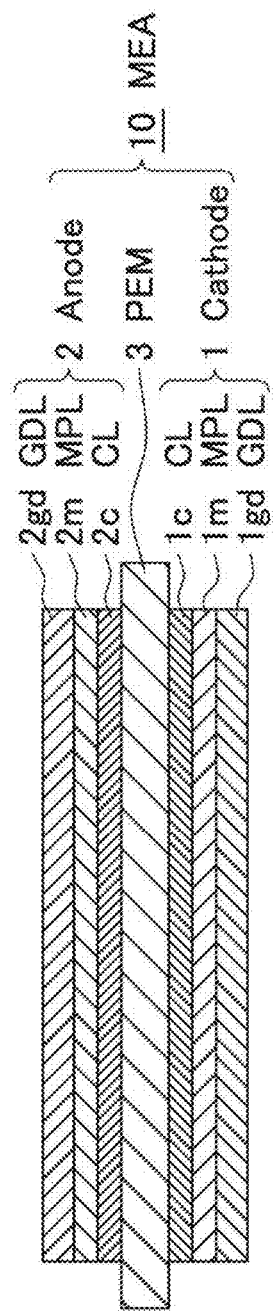
FIG. 1 is a schematic cross-sectional view showing a preferred embodiment of the MEA of the present invention.

FIG. 1 is a schematic cross-sectional view showing a preferred embodiment of the MEA of the present invention.

The MEA10 shown in FIG. 1 has the configuration provided with two gas diffusion electrodes (the cathode 1 and the anode 2) having the shape of a plate arranged in the state opposing each other, and the polymer electrolyte membrane (Polymer Electrolyte Membrane, hereinafter referred to as "PEM" if needed) 3 arranged between the cathode 1 and the anode 2.

In this MEA10, at least one of the cathode 1 and the anode 2 has a configuration in which a core-shell catalyst to be described later is contained.

The MEA10 can be produced by laminating the cathode 1, the anode 2, and the PEM 3 as shown in FIG. 1 and then applying a pressure to adhere the laminated cathode 1, anode 2, and PEM 3.

<Gas Diffusion Electrode (GDE)>

The cathode 1 as a gas diffusion electrode has a configuration including a gas diffusion layer 1gd and a catalyst layer 1c, which is formed on the PEM 3 side surface of the gas diffusion layer 1gd. Further, the cathode 1 has a water repellent layer (Micro Porous Layer, hereinafter, referred to as "MPL" as needed) 1m arranged between the gas diffusion layer 1gd and the catalyst layer 1c.

Similarly to the cathode 1, the anode 2, which is a gas diffusion electrode, has a configuration including a gas diffusion layer 2gd and a catalyst layer 2c, which is formed on the PEM 3 side surface of the gas diffusion layer 2gd, and a MPL 2m, which is arranged between the gas diffusion layer 2gd and the catalyst layer 2c.

(Catalyst Layer (CL))

In the cathode 1, the catalyst layer 1c is a layer in which a reaction proceeds such that water is generated from air (oxygen gas) sent from the gas diffusion layer 1gd and hydrogen ions moving through the PEM 3 from the anode 2.

In addition, in the anode 2, the catalyst layer 2c is a layer in which a reaction in which hydrogen ions and electrons are generated from hydrogen gas sent from the gas diffusion layer 2gd proceeds.

At least one of the catalyst layer 1c of the cathode 1 and the catalyst layer 2c of the anode 2 includes a core-shell catalyst in accordance with the electrode catalyst of the present invention.

(Core-Shell Catalyst in Accordance with the Electrode Catalyst of the Present Invention)

Hereinafter, the core-shell catalyst will be described with reference to FIGS. 2 to 4.

Figure 2:
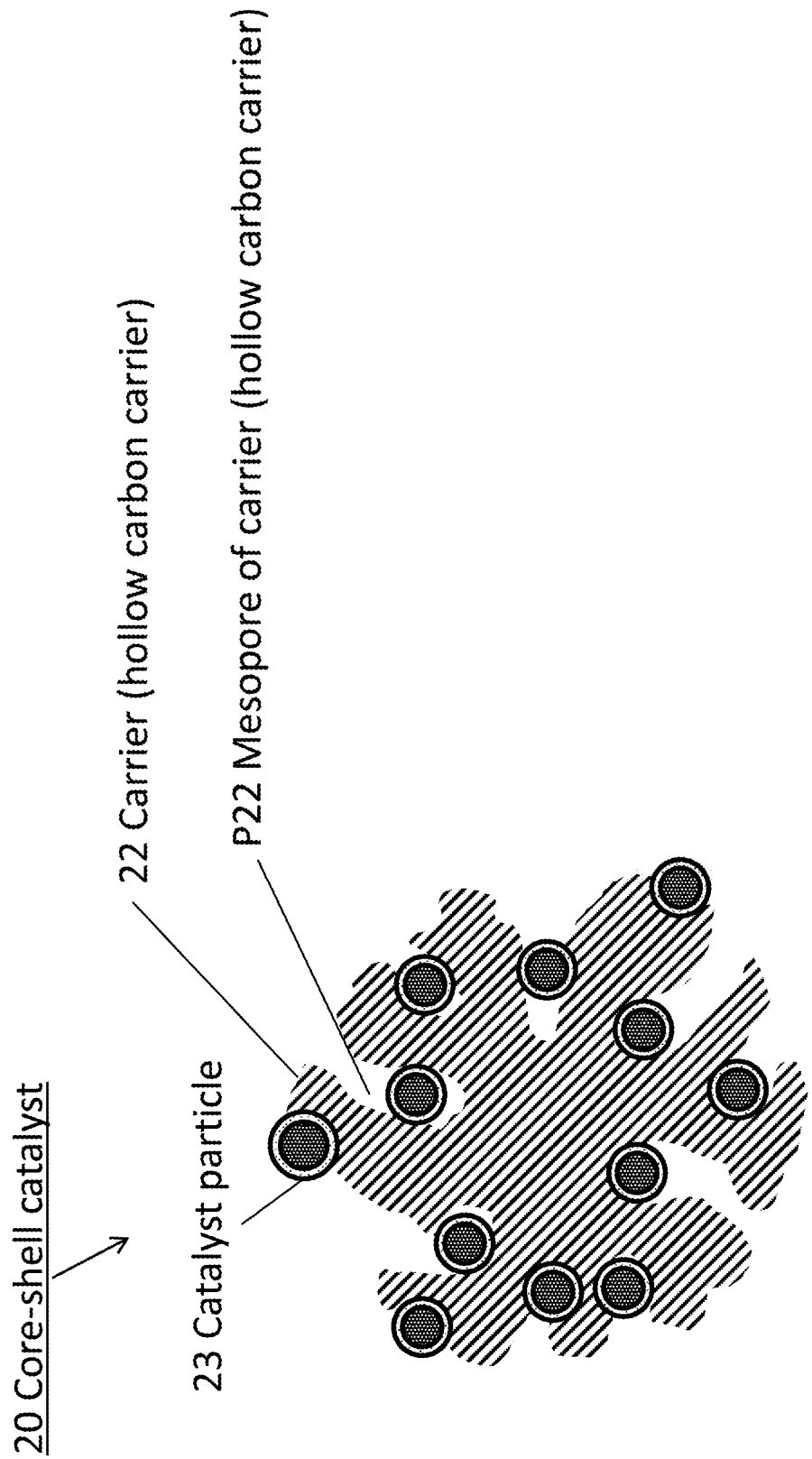
FIG. 2 is a schematic cross-sectional view showing a preferred embodiment of the core-shell catalyst included in at least one of the cathode catalyst layer and the anode catalyst layer of the MEA shown in FIG. 1.

FIG. 2 is a schematic cross-sectional view showing a preferred embodiment of the core-shell catalyst included in at least one of the cathode catalyst layer 1c and the anode catalyst layer 2c of the MEA10 shown in FIG. 1. Further, FIG. 3 is an enlarged schematic cross-sectional view showing a schematic configuration of the core-shell catalyst 20 shown in FIG. 2.

Figure 3:
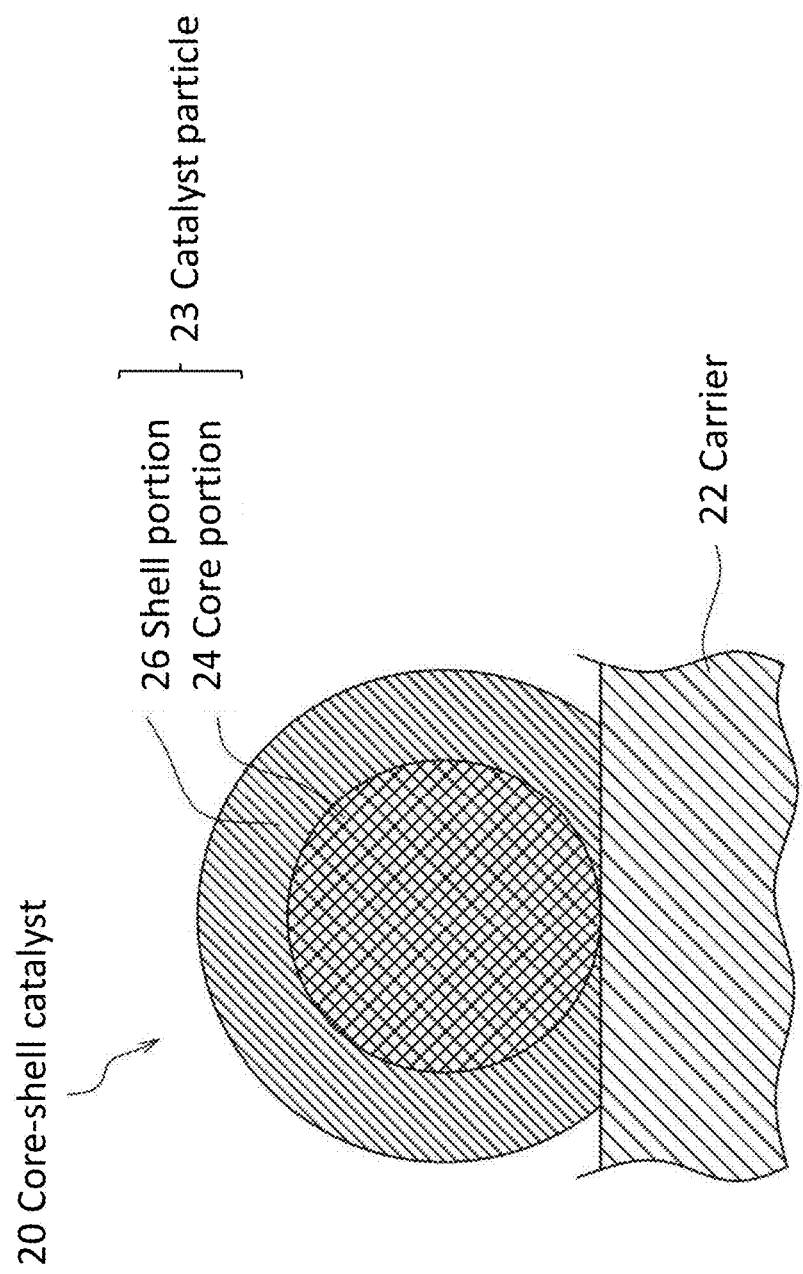
FIG. 3 is an enlarged schematic cross-sectional view showing a schematic configuration of the core-shell catalyst shown in FIG. 2.

As shown in FIGS. 2 and 3, the core-shell catalyst 20 includes a carrier 22, which is a hollow carbon carrier, and a catalyst particle 23, which has a so-called "core-shell structure" and is supported on the carrier 22.

Further, the catalyst particle 23 has a core portion 24 and a shell portion 26, which is formed so as to coat at least a part of the surface of the core portion 24.

Thus, the core-shell catalyst 20 has a catalyst particle 23 supported on the carrier 22, and the catalyst particle 23 has a structure (core-shell structure) in which the core portion 24 serves as the core and the shell portion 26 serves as the shell to coat at least a part of the surface of the core portion 24.

Further, in the core-shell catalyst 20, the constitutional element (chemical composition) of the core portion are different from a constitutional element (chemical composition) of the shell portion in their configurations.

The configuration of the core-shell catalyst 20 is not particularly limited as long as the shell portion 26 is formed on at least a part of the surface of the core portion 24 of the catalyst particles 23.

For example, from the viewpoint of more reliably obtaining excellent catalytic activity and durability, as shown in FIG. 3, the core-shell catalyst 20 is preferably in a state in which substantially the entire surface of the core portion 24 is coated by the shell portion 26.

Figure 4:
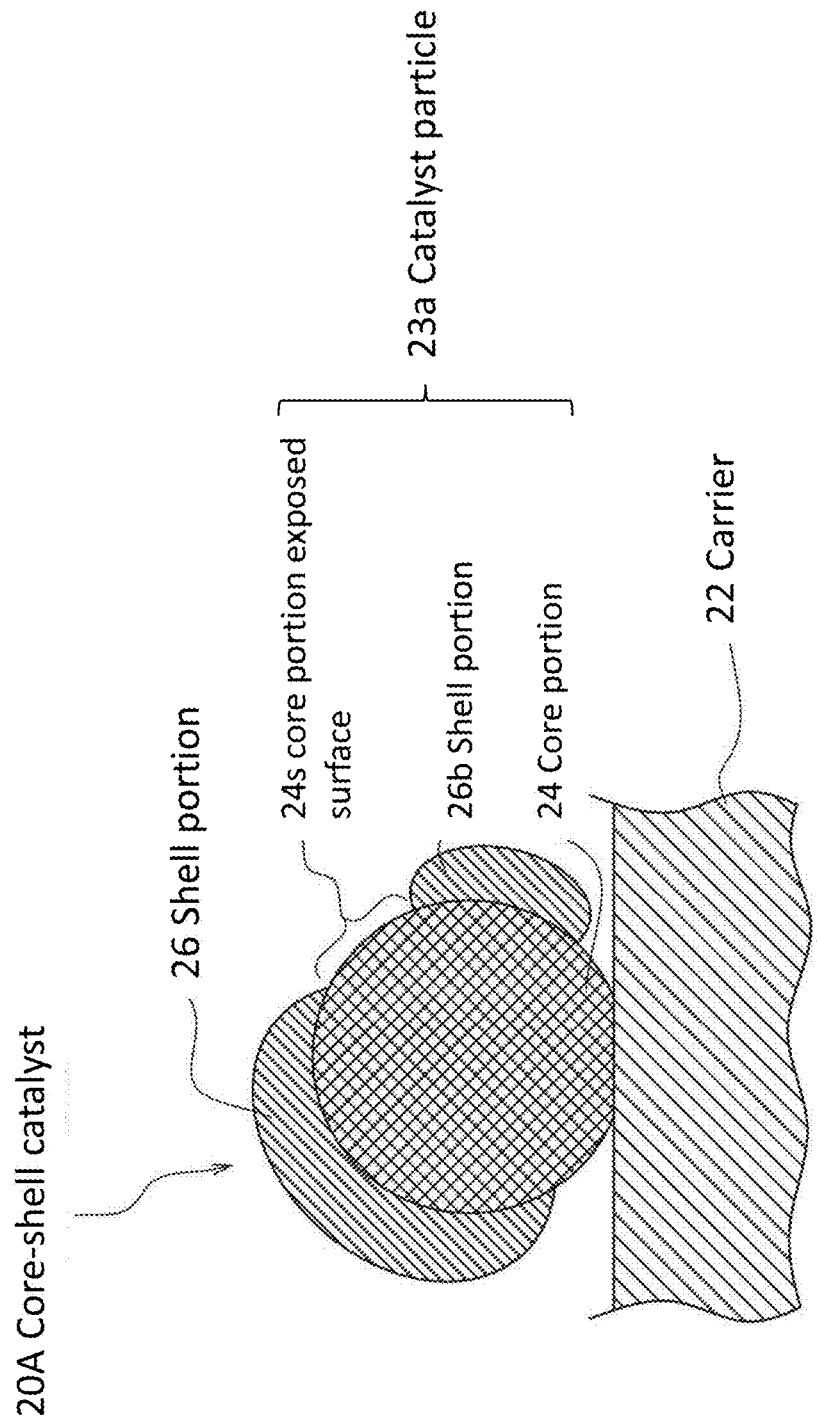
FIG. 4 is a schematic cross-sectional view showing another preferred embodiment of the core-shell catalyst shown in FIG. 3.

FIG. 4 is a schematic cross-sectional view illustrating another preferred embodiment 20A of the core-shell catalyst included in at least one of the cathode catalyst layer 1c and the anode catalyst layer 2c of the MEA 10 shown in FIG. 3.

The core-shell catalyst 20A shown in FIG. 4 includes the catalyst particle 23, which is composed of the core portion 24 and the shell portion 26 coating a part of the surface of the core portion 24.

As described above, in the range in which the effect of the present invention is obtained, the core-shell catalyst 20A may be in a state in which a part of the surface of the core portion 23 is coated by the shell portion 26 and a part of the surface of the core portion 23 (the core portion exposed surface 24s) is exposed.

In other words, in the range in which the effect of the present invention is obtained, it is sufficient that the core-shell catalyst 20A has the shell portion 26 formed on at least a part of the surface of the core portion 24.

In addition, in the range in which the effect of the present invention is obtained, the core-shell catalyst may be in a state in which "a composite of the core portion and the shell portion in a state in which substantially the entire area of the surface of the core portion is coated by the shell portion" and "a composite of the core portion and the shell portion in a state in which a part of the surface of the core portion is coated by the shell portion" are mixed on the carrier.

For example, it is possible to have a state in which the core-shell catalyst 20A and the core-shell catalyst 20B shown in FIG. 3 and FIG. 4 may be mixed.

Further, in the range in which the effect of the present invention can be obtained, the core-shell catalysts 20, 20A shown in FIGS. 2 to 4 may have a state in which at least one of the catalyst particles 23, 23a shown in FIGS. 2 to 4 and additionally "a particle composed only of the core portion in which the core portion is not coated by the shell portion" are supported on the carrier 22 (not shown).

Further, in the range in which the effect of the present invention can be obtained, the core-shell catalysts 20, 20A shown in FIGS. 2 to 4 may have a state in which at least one of the catalyst particles 23, 23a shown in FIGS. 2 to 4 and additionally "a particle composed only of constituent elements of the shell portion" are not in contact with the core portion but supported on the carrier 22 (not shown).

In addition, in the range in which the effect of the present invention can be obtained, the core-shell catalysts 20, 20A shown in FIGS. 2 to 4 may have a state in which at least one of the catalyst particles 23, 23a shown in FIGS. 2 to 4 and additionally "a particle of only the core portion not coated by the shell portion" and "a particle of only the constituent elements of the shell portion" are independently supported on the carrier 22 (not shown).

In addition, it is preferable that the core-shell catalysts 20, 20A shown in FIGS. 2 to 4 satisfy the following conditions from the viewpoint of more reliably obtaining the effect of the present invention.

Thus, as previously described, the core-shell catalysts 20, 20A, 20B, and 20C shown in FIGS. 2 to 4 preferably have an average crystallite size of 3 to 16.0 nm as measured by powder X-ray diffraction (XRD).

In the core-shell catalysts 20, 20A shown in FIGS. 2 to 4, it is preferable that the core portion 24 includes Pd (0 valent). In addition, from the viewpoint of more reliably obtaining the effect of the present invention and from the viewpoint of ease of manufacturing and the like, the core portion 24 is preferably composed of Pd (0 valent) as a main component (50 wt % or more), and more preferably composed of Pd (0 valent).

In the core-shell catalysts 20 and 20A shown in FIGS. 2 to 4, it is preferable that the shell portions 26 and 26a (26b) includes Pt (0 valent). In addition, from the viewpoint of more reliably obtaining the effect of the present invention and from the viewpoint of ease of manufacturing and the like, the shell portions 26 and 26a preferably are composed of Pt (0 valent) as a main component (50 wt % or more), and more preferably are composed only of simple Pt.

In addition, the core-shell catalysts 20, 20A shown in FIGS. 2 to 4 preferably have a Pt supporting ratio of 0.6 to 33.0 wt %, and preferably have a Pd supporting ratio of 4.7 to 47.0 wt %.

Further, the core-shell catalysts 20, 20A shown in FIGS. 2 to 4 preferably have a noble metal supporting ratio of 5.6 to 66.5 wt % in total, the noble metal including Pt and Pd in combination.

Since the catalyst particles 23, 23a shown in FIGS. 2 to 4 of the core-shell catalysts 20, 20A shown in FIGS. 2 to 4 exhibit superior catalytic activity, the thickness of the outermost shell portions 26, 26a of each is sufficiently thin so as to have a level capable of exhibiting a so-called base effect (ligand effect) of the core portion 24.

That is, the average thickness of the shell portions (shell portions 26, 26a) of the core-shell catalysts 20, 20A shown in FIGS. 2 to 4 is 0.2 to 1.0 nm, preferably 0.2 to 0.9 nm, more preferably 0.2 to 0.7 nm, and still more preferably 0.2 to 0.5 nm.

For example, in the case where the shell portion (shell portion 26, 26a) is a layer composed of Pt, the thickness can be 4 or less layers, preferably 3 or less layers, and more preferably 2 or less layers of the Pt atomic layer in the range of the above average thickness. The reason is that the metal bonding radius of Pt is 0.139 nm, so that the average thickness of one layer of Pt atoms is about 0.21 nm to 0.23 nm. Alternatively, the reason is that the plane spacing (dill) of platinum is 0.2265 nm (=k/√3) when the lattice constant (K) of simple Pt is K=0.39231 nm.

When the average thickness of the shell portion (shell portion 26, 26a) is less than 0.2 nm, the surface of the core portion 24 is not sufficiently coated by the shell portion (shell portion 26, 26a) and elution of the constituent materials of the core portion 24 occurs, making it difficult to maintain the core-shell structure. Therefore, there is a large tendency that sufficient catalytic activity as a core-shell catalyst cannot be obtained. In addition, durability and reliability also tends to become insufficient.

In addition, when the average thickness of the shell portion (shell portion 26, 26a) exceeds 1.0 nm, there is a large tendency that it cannot contribute to cost reduction (decrease of platinum) of PEFC. In addition, in this case, it becomes difficult to exhibit a so-called base effect (ligand effect) of the core portion 24, so that there is a large tendency that it becomes difficult to obtain catalytic activity exceeding a conventional Pt/C catalyst.

Further, the average thickness of the shell portion (shell portion 26, 26a) can be obtained, for example, by evaluating the average particle size of the catalyst particle and the average particle size of the core portion by means of SEM images (Scanning Electron Microscopy image) or TEM images (Transmission Electron Microscopy image) of respectively. In other words, the average thickness of the shell portion can be determined by the difference between the average particle size of the catalyst particle (23, 23a) and the average particle size of the core portion 24.

Further, the average thickness of the shell portion (shell portion 26, 26a) can also be determined by obtaining the average particle size of the catalyst particle (23, 23a) and the average particle size of the core portion 24 by means of for example, line analysis of TEM-EDX (Transmission Electron Microscopy-Energy Dispersive X-ray Spectroscopy transmission electron microscopy energy dispersive X-ray analysis method in the particle size direction of the catalyst particles) or TEM-EDX (Transmission Electron Microscopy-Energy Dispersive X-ray Spectroscopy: transmission electron microscopy energy dispersive X-ray analysis method).

The carrier 22 is not particularly limited as long as it has mesopores (mesopores defined in IUPAC) having a pore size of 2 to 50 nm, and is capable of supporting a composite composed of the core portion 24 and the shell portion 26 (or a shell portion 26a), and is a hollow carbon carrier having a relatively large surface area.

Further, it is preferable that the carrier 22 is a hollow carbon carrier having good dispersibility in a composition for forming gas diffusion electrode including the core-shell catalyst 20 (or 20A) and having excellent conductivity.

As the hollow carbon carrier, Ketjen black EC300J and Ketjen black EC600JD can be exemplified. For example, as these commercially available products, trade names "carbon EPC", "carbon EPC600JD" and the like (such as those manufactured by Lion Chemical Co., Ltd.) can be exemplified. As for Ketjen Black EC300J and Ketjen Black EC600JD, for example, detailed features are described in the document [Characteristics and application development of conductive carbon black "Ketjen Black EC"] published on the internet by the "Functional Carbon Filler Research Society".

As other hollow carbon carriers, a trade name "MCND (Mesoporous Carbon Nano-Dendrite" (manufactured by Nippon Steel Sumitomo Chemical Co., Ltd.), a trade name "Knobell (CNovel)" (manufactured by Toyo Carbon Co., Ltd.), and a trade name "black pearls 2000" (manufactured by Cabot Co., Ltd.) can be exemplified.

Here, from the viewpoint of more reliably obtaining the effect of the present invention, it is preferable that the hollow carbon carrier is Ketjen black EC300J. Then, in this case, from the same viewpoint, the BET specific surface area (nitrogen adsorption specific surface area) of the hollow carbon carrier (Ketjen black EC300J) measured by using nitrogen is preferably 750 to 800 m$^2$/g.

Here, as shown in FIG. 2, the catalyst particle 23 (and 23a) is supported both inside and outside mesopores of the carrier 22.

Then, the core-shell catalyst 20 (and 20a) simultaneously satisfies the conditions of the following the formula (1) and the formula (2) in case that a measurement of electron beam tomography (electron tomography) by 3D-STEM is carried out.

$$D1<D2 \qquad (1)$$

$$(N1/N2)>1.0 \qquad (2)$$

Here, in the formula (1) and the formula (2), D1 indicates a sphere equivalent diameter (nm) of particles exhibiting a maximum frequency among the catalyst particles 23 (or 23a) supported inside the mesopore P22 of the carrier 22.

In addition, in the formula (1) and the formula (2), D2 indicates a sphere equivalent diameter (nm) of particles exhibiting a maximum frequency among the catalyst particles 23 (or 23a) supported outside the mesopore P22 of the carrier 22.

Further, in the formula (1) and the formula (2), N1 indicates a frequency (number of particles) of particles exhibiting a maximum frequency among the catalyst particles 23 (or 23a) supported inside the mesopore P22 of the carrier 22.

In addition, in the formula (1) and the formula (2), N2 indicates a frequency (number of particles) of particles exhibiting a maximum frequency among the catalyst particles 23 (or 23a) supported outside the mesopore P22 of the carrier 22.

In the case of the core-shell catalyst 20 (and 20a) which simultaneously satisfies the conditions of the formula (1) and the formula (2), as compared with a conventional electrode catalyst, there exist many catalyst particles 23 (or 23a) having a core-shell structure with high activity inside the mesopore P22 of the carrier 22 in a relatively small particle size. The catalyst particle 23 (or 23a) having a core-shell structure supported inside the mesopores P22 of such a carrier 22 exhibits excellent catalytic activity when made into an electrode as compared with a conventional electrode catalyst. In addition, the catalyst particle 23 (or 23a) is supported on the carrier 22 in a state in which it is difficult to directly contact with a polymer electrolyte such as Nafion included in the catalyst, and the dissolution of the Pt component is also reduced.

The method for producing the core-shell catalyst 20 and 20A is not particularly limited and can be produced by a known method, except that it includes a "carrier pretreatment step" for satisfying the conditions of the formula (1) and the formula (2).

In the carrier pretreatment step, the temperature is held at 80 to 99° C., preferably 90 to 99° C., for a predetermined time while stirring the dispersion liquid in which the carrier 22 is dispersed in ultrapure water (although maintained in a not boiled state).

Thus, the gas inside the mesopore P22 of the carrier 22 is removed, so that ultrapure water can sufficiently enter into inside the mesopore P22. Then, in the subsequent core portion forming step, the raw materials of the core portion 24 are sufficiently held inside the mesopore P22 of the carrier 22. Thus, a large number of the core particles serving as a precursor of the core portion 24 are supported inside the mesopore P22 of the carrier 22.

Note that "ultrapure water" used in this carrier pretreatment step is water in which the specific resistance R (reciprocal of the electric conductivity measured by the JIS standard test method (JIS K0552)) represented by the following the formula (3) is 3.0M Ω cm or more. In addition, it is preferable that "ultrapure water" has a quality equivalent to "A3" or a clean quality equivalent to or higher than that of "A3" defined in "JISK0557 water used for testing of water and waste".

This ultrapure water is not particularly limited as long as it has an electric conductivity satisfying the relation represented by the following formula (3). For example, ultrapure water produced using an ultrapure water producing apparatus "Milli-Q Series" (manufactured by Merck Co., Ltd.) and "Elix UV Series" (manufactured by Nippon Millipore Co., Ltd.) can be mentioned as the above ultrapure water.

$$R=1/p \qquad (3)$$

In the above formula (3), R represents a specific resistance, and p represents an electric conductivity measured by a JIS standard test method (JIS K0552)

After the "carrier pretreatment step", for example, there may be mentioned a producing method having a configuration including a "core portion forming step" to form Pd/C particles (powder) in which the core particle including simple Pd is supported on the carrier including the conductive carbon material as a constituent, and a "shell portion forming step" to form the shell portion including simple Pt so as to cover at least a part of the surface of the core particle of the Pd/C particles (powder) obtained through the core portion forming step.

The core-shell catalysts 20 and 20A can be produced by sequentially supporting the core portion 24 and the shell portion 26, 26a, which constitute the catalyst particle 23, 23a, on the carrier 22.

For example, there are exemplified an impregnation method in which a solution containing a catalyst component is brought into contact with the carrier 22 and a catalyst component is impregnated into the carrier 22, a liquid phase reduction method in which a reducing agent is added into a solution containing a catalyst component, an electrochemical deposition method such as an underpotential deposition (UPD) method, a chemical reduction method, a reduction deposition method by adsorbed hydrogen, a surface leaching method of an alloy catalyst, a substitution plating method, a sputtering method, a vacuum deposition method, and the like.

The polymer electrolyte contained in the catalyst layer 1c and the catalyst layer 2c is not particularly limited as long as it has hydrogen ion conductivity, and known ones can be used. For example, the polymer electrolyte can exemplify a known perfluorocarbon resin having a sulfonic acid group and a carboxylic acid group. Examples of easily available polymer electrolytes having hydrogen ion conductivity include Nafion (registered trademark, manufactured by DuPont), Aciplex (registered trademark, manufactured by Asahi Kasei Co., Ltd.), and Flemion (registered trademark, manufactured by Asahi Glass Co., Ltd.).

Then, at least one of the catalyst layer 1c of the cathode 1 and the catalyst layer 2c of the anode 2 shown in FIG. 1 has a mass ratio N/C of the mass N of the polymer electrolyte to the mass C of the carrier 22 of 0.5 to 1.2, and more preferably a mass ratio N/C of 0.7 to 1.0.

(Gas Diffusion Layer (GDL))

The gas diffusion layer 1gd provided in the cathode 1 shown in FIG. 1 is a layer provided for supplying an oxidant gas (e.g., oxygen gas, air) to the catalyst layer 1c. In addition, the gas diffusion layer 1gd serves to support the catalyst layer 1c.

In addition, the gas diffusion layer 2gd provided in the anode 2 is a layer provided for supplying a reducing agent gas (e.g., hydrogen gas) to the catalyst layer 2c. And, the gas diffusion layer 2gd serves to support the catalyst layer 2c.

The gas diffusion layer (1gd) shown in FIG. 1 has a function and structure to pass hydrogen gas or air (oxygen gas) well to reach the catalyst layer. Therefore, it is preferable that the gas diffusion layer has water repellency. For example, the gas diffusing layer has a water repellent component such as polyethylene terephthalate (PTFE).

The member which can be used for the gas diffusion layer (1gd) is not particularly limited, and a known member can be used. For example, preferably, there are exemplified carbon paper and other material, in which carbon paper is used as a main material and auxiliary materials including carbon powder, ion exchange water, and a polyethylene terephthalate dispersion as a binder is applied on the carbon paper.

(Water Repellent Layer (MPL))

As shown in FIG. 1, a water repellent layer (MPL) 1m is arranged between the gas diffusion layer 1gd and the catalyst layer 1c at the cathode 1. The water repellent layer 1m has electronic conductivity, water repellency, and gas diffusing property, and is provided for facilitating diffusion of the oxidant gas into the catalyst layer 1gd and discharge of the reaction product water generated in the catalyst layer 1gd. The configuration of the water repellent layer 1m is not particularly limited, and a known configuration can be employed.

(Polymer Electrolyte Membrane (PEM))

The polymer electrolyte membrane (PEM) 3 shown in FIG. 1 is not particularly limited as long as it has hydrogen ion conductivity, and a known one conventionally used in PEFC can be employed. For example, it may be a membrane including as a constituent a polymer electrolyte exemplified above as ones contained in the catalyst layer 1c and the catalyst layer 2c.

<Modified Embodiment of MEA>

While a preferred embodiment of the MEA of the present invention (and the catalyst layer of the present invention, the gas diffusion electrode of the present invention) is described above, the MEA of the present invention is not limited to the configuration of the MEA 10 shown in FIG. 1.

Figure 5:
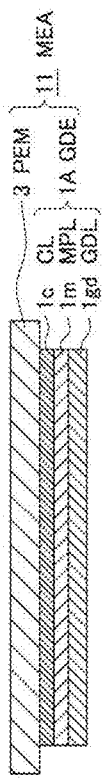
FIG. 5 is a schematic cross-sectional view showing another preferred embodiment of the MEA of the present invention.

For example, the MEA of the present invention may have the configuration of the MEA 11 shown in FIG. 5.

FIG. 5 is a schematic cross-sectional view illustrating another preferred embodiment of the MEA of the present invention; The MEA 11 shown in FIG. 5 has a configuration in which the gas diffusing electrode (ODE) 1A having the same configuration as that of the cathode 1 in the MEA10 shown in FIG. 1 is arranged on only one side of the polymer electrolyte membrane (PEM) 3. However, the catalyst layer 1c of the gas diffusion electrode (ODE) 1A has a configuration of the catalyst layer of the present invention. In other words, the catalyst layer 1c of the GDE 1A has a mass ratio N/C of the mass N of the polymer electrolyte to the mass C of the carrier of the core-shell catalyst of 0.5 to 1.2, more preferably 0.7 to 1.0.

<Catalyst Coated Membrane (CCM)>

Next, a preferred embodiment of the catalyst coated membrane (CCM) of the present invention will be described.

Figure 6:
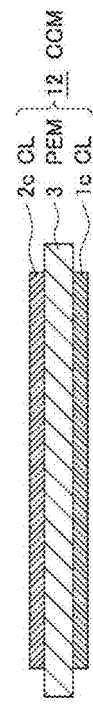
FIG. 6 is a schematic cross-sectional view showing a preferred embodiment of the CCM of the present invention.

FIG. 6 is a schematic cross-sectional view showing a preferred embodiment of the CCM of the present invention. The CCM 12 shown in FIG. 6 has a configuration in which a polymer electrolyte membrane (PEM) 3 is arranged between the cathode catalyst layer 1c and the anode catalyst layer 2c. Then, at least one of the cathode catalyst layer 1c and the anode catalyst layer 2c has a configuration of the catalyst layer of the present invention. In other words, at least one of the cathode catalyst layer 1c and the anode catalyst layer 2c has a mass ratio N/C of the mass N of the polymer electrolyte to the mass C of the carrier of the core-shell catalyst of 0.5 to 1.2, more preferably 0.7 to 1.0

<Modified embodiment of Catalyst Coated Membrane (CCM)>

While a preferred embodiment of the CCM of the present invention has been described above, the CCM of the present invention is not limited to the configuration of the CCM 12 shown in FIG. 6.

Figure 7:
FIG. 7 is a schematic cross-sectional view showing another preferred embodiment of the CCM of the present invention.

For example, the CCM of the present invention may have a configuration of the CCM 13 shown in FIG. 7.

FIG. 7 is a schematic cross-sectional view illustrating another preferred embodiment of the CCM of the present invention. The CCM 13 shown in FIG. 7 has a configuration in which the catalyst layer 1c having the same configuration as that of the cathode 1 in the CCM 12 shown in FIG. 6 is arranged on only one side of the polymer electrolyte membrane (PEM) 3. However, the catalyst layer 1c of the gas diffusion electrode (GDE) 1A has a configuration of the catalyst layer of the present invention. In other words, the catalyst layer 1c of the CCM 13 has a mass ratio N/C of the mass N of the polymer electrolyte to the mass C of the carrier of the core-shell catalyst of 0.5 to 1.2, more preferably 0.7 to 1.0.

<Gas Diffusion Electrode (GDE)>

Next, a preferred embodiment of the gas diffusion electrode (ODE) of the present invention will be described.

Figure 8:
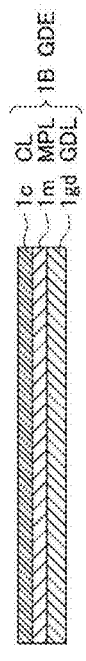
FIG. 8 is a schematic cross-sectional view showing a preferred embodiment of the GDE of the present invention.

FIG. 8 is a schematic cross-sectional view showing a preferred embodiment of the GDE of the present invention. The gas diffusion electrode 1B shown in FIG. 8 has the same configuration as that of the cathode 1 mounted on the MEA 10 shown in FIG. 1. However, the catalyst layer 1c of the gas diffusion electrode (ODE) 1B has a configuration of the catalyst layer of the present invention. In other words, the catalyst layer 1c of the gas diffusion electrode (ODE) 1B has a mass ratio N/C of the mass N of the polymer electrolyte to the mass C of the carrier of the core-shell catalyst of 0.5 to 1.2, more preferably 0.7 to 1.0.

<Modified Embodiment of Gas Diffusion Electrode (GDE)>

While a preferred embodiment of the GDE of the present invention has been described above, the GDE of the present invention is not limited to the configuration of the GDE 1B shown in FIG. 8.

Figure 9:
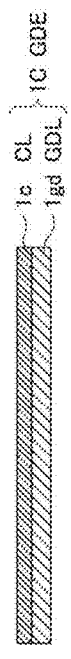
FIG. 9 is a schematic cross-sectional view showing another preferred embodiment of the GDE of the present invention.

For example, the GDE of the present invention may have the composition of GDE 1C shown in FIG. 9.

FIG. 9 is a schematic cross-sectional view illustrating another preferred embodiment of the GDE of the present invention; The GDE 1C shown in FIG. 9 has a configuration in which the water repellent layer (MPL) is not arranged between the catalyst layer 1c and the gas diffusion layer 1gd as compared with the GDE 1B shown in FIG. 8.

<Composition for Forming Catalyst Layer>

Next, a preferred embodiment of the composition for forming catalyst layer of the present invention will be described.

A composition for forming catalyst layer of the present embodiment includes a core-shell catalyst, a polymer electrolyte, and a main component, and has a mass ratio N/C of mass N of polymer electrolyte to mass C of carrier of core-shell catalyst of 0.5 to 1.2, more preferably 0.7 to 1.0.

Here, the composition of the liquid including the polymer electrolyte is not particularly limited. For example, a liquid including a polymer electrolyte may contain a polymer electrolyte having hydrogen ion conductivity described above, water, and an alcohol.

The composition ratio of the core-shell catalyst, the polymer electrolyte, and other components (water, alcohol, and the like) included in the composition for forming catalyst layer is appropriately set so that the dispersion state of the core-shell catalyst in the obtained catalyst layer becomes good and the power generation performance of the MEA including the catalyst layer can be improved.

The composition for forming catalyst layer can be prepared by mixing a liquid including the core-shell catalyst and the polymer electrolyte and stirring the mixture. From the viewpoint of adjusting applicability, a polyhydric alcohol such as glycerin and/or water may be contained. When the liquid including the core-shell catalyst, the polymer electrolyte is mixed, a pulverizing and mixing machine such as a ball mill, an ultrasonic disperser and the like can be used.

At least one of the catalyst layer 1c of the cathode 1 and the catalyst layer 2c of the anode 2 shown in FIG. 1 can be formed using a preferred embodiment of the composition for forming catalyst layer of the present invention.

(Method for Producing Gas Diffusion Electrode)

Next, an example of a method of producing gas diffusion electrode of the present invention will be described. It is sufficient that the gas diffusion electrode is formed so as to include the catalyst layer of the present invention, and a known method can be employed for the producing method. It can be more reliably produced by using the composition for forming catalyst layer of the present invention.

For example, it may be produced by coating a composition for forming catalyst layer on a gas diffusion layer (or a water repellent layer of a laminate in which a water repellent layer is formed on a gas diffusion layer) and drying the composition.

<Fuel Cell Stack>

Figure 10:
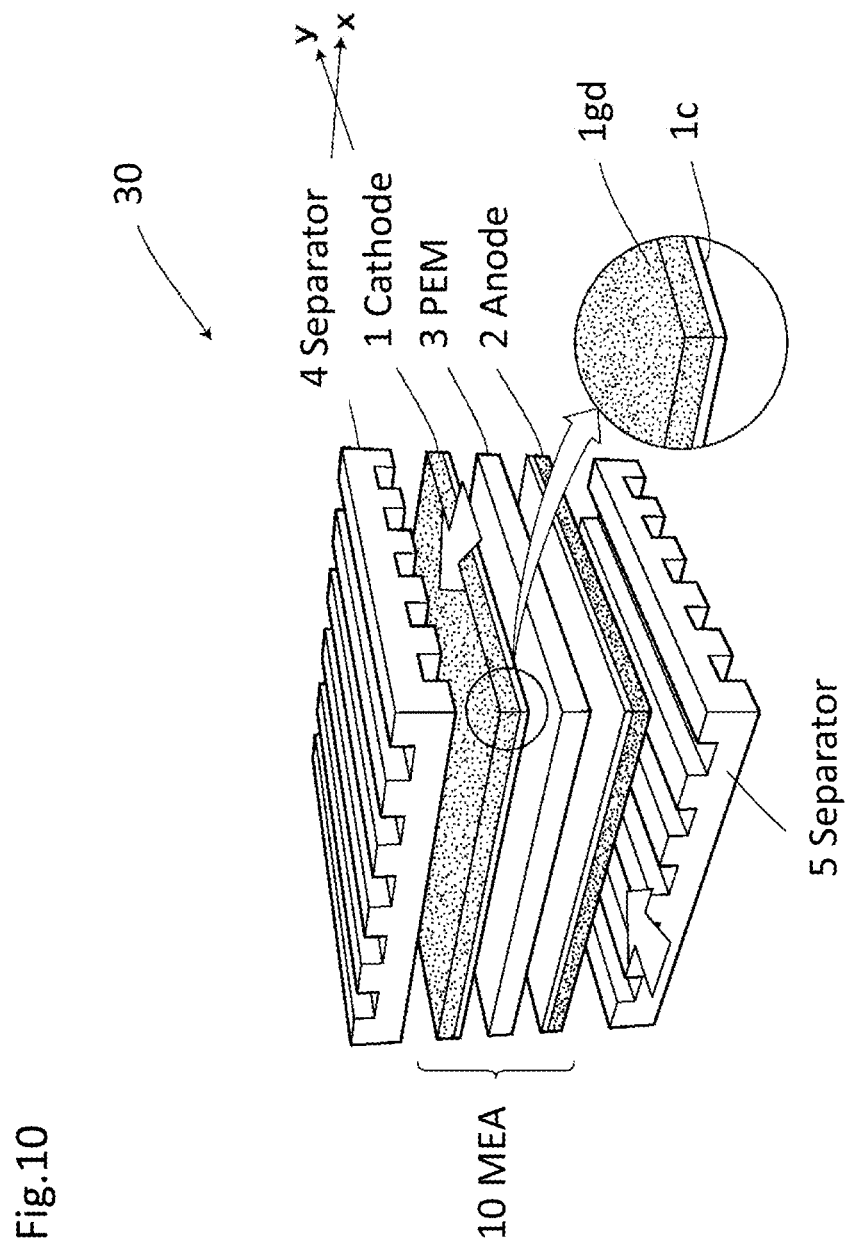
FIG. 10 is a schematic diagram showing one preferred embodiment of the fuel cell stack of the present invention.
Figure 11:
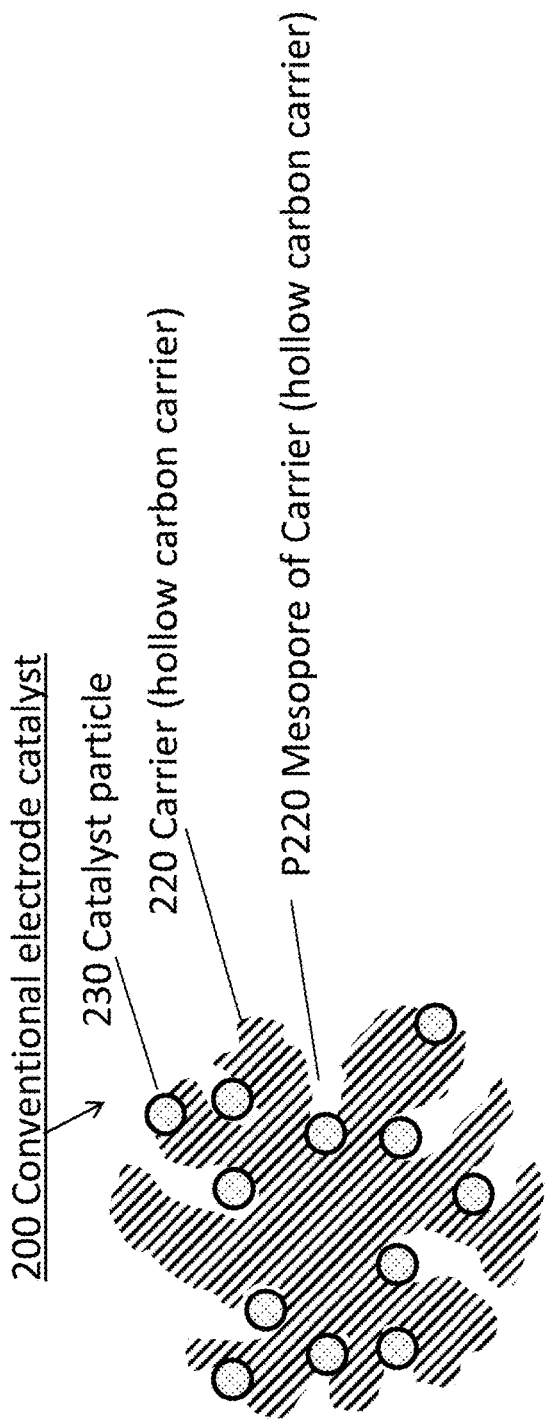
FIG. 11 is a schematic cross-sectional view showing a conventional electrode catalyst.
Figure 12:
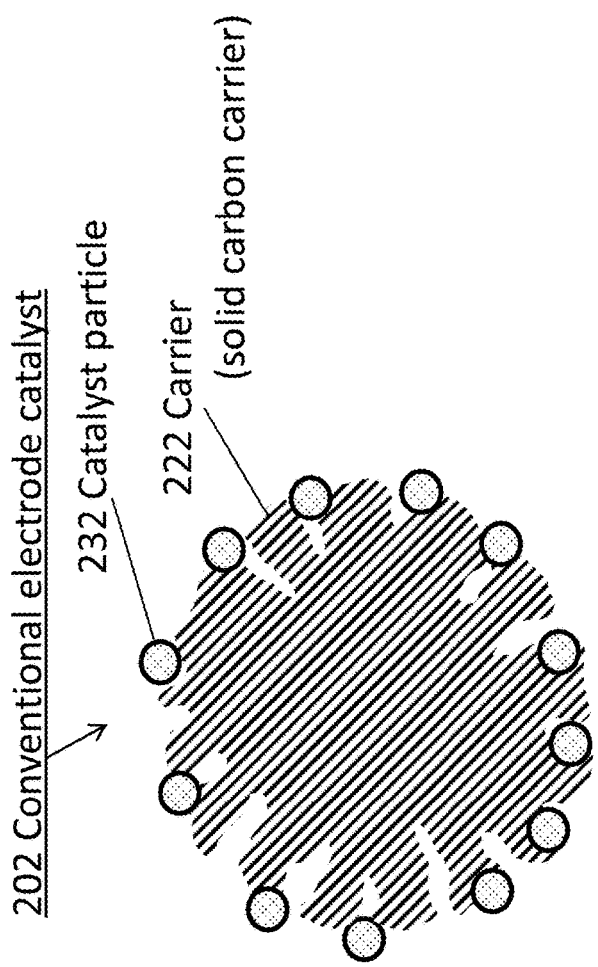
FIG. 12 is a schematic cross-sectional view showing a conventional electrode catalyst.

FIG. 10 is a schematic diagram illustrating one preferred embodiment of the fuel cell stack of the present invention.

The fuel cell stack 30 illustrated in FIG. 10 has a configuration in which the MEA 10 shown in FIG. 1 is a unit cell and a plurality of the unit cells are stacked. Further, the fuel cell stack 30 has a configuration in which the MEA 10 is arranged between the separator 4 and the separator 5. A gas flow passage is formed in the separator 4 and the separator 5, respectively.

EXAMPLE

The present invention is further illustrated by the following examples, which are not intended to limit the present invention.

(I) Preparation of the Electrode Catalyst for Use in the Cathode Catalytic Layer of the MEA (1) Preparation of a Core-Shell Catalyst for Use in the Cathode of the MEA of Example 1

["Pt/Pd/C" Powder Having a Shell Portion Composed of Pt on Pd/C]

A "Pt/Pd/C" powder {Pt supporting ratio of 18.4 wt % (ICP analytical result), trade name "NE-K10218-BC", manufactured by N.E. CHEMCAT Co., Ltd.}, in which the shell portion composed of Pt was formed on Pd of particles of "Pd/C" powder described below, was prepared as the core-shell catalyst (hereinafter, referred to as "core-shell catalyst A")

This Pt/Pd/C powder was prepared by using a Pd/C powder described below, forming membrane composed of Cu on the surface of the core particles composed of Pd of the Pd/C by a common Cu-UPD method, and then proceeding the galvanic substitution reaction of Cu and Pt using potassium platinate.

[Core Particle Supported Carbon "Pd/C" Powder]

A Pd/C powder {Pd supporting ratio of 30 wt %, trade name "NE-K00230-C", manufactured by N.E. CHEMCAT Co., Ltd.)} in which core particles composed of Pd were supported on carbon black powder was prepared.

This Pd/C powder was prepared by the following steps.

(First Step (Carrier Pretreatment Step))

A dispersion liquid, in which a commercially available hollow carbon carrier {manufactured by Lion Co., Ltd., trade name "Carbon ECP" (Ketjen Black EC300J), a specific surface area of 750 to 800 $m^2/g$} was dispersed in ultrapure water, was held at 90 to 99° C. for 1.5 hours while stirring (although a not boiled state was retained).

Note that "ultrapure water" used in this first step (carrier pretreatment step) was a water having a specific resistance R (reciprocal of electric conductivity measured by a JIS standard test method (JIS K0552)) represented by the following formula (3) of 3.0M Ωcm or more. In addition, ultrapure water had a water quality equivalent to or higher than that of A3 specified in JISK0557 Water for Testing Water and Wastewater.

This ultrapure water was produced using an ultrapure water producing apparatus "Milli-Q Series" (manufactured by Merck Co., Ltd.) and "Elix UV Series" (manufactured by Nippon Millipore Co., Ltd.).

$$R=1/p \qquad (3)$$

In the above general formula (3), R represents a specific resistance, and p represents an electric conductivity measured by a JIS standard test method (JIS K0552).

(Second Step)

A mixed liquid obtained by adding sodium tetrachloropalladium (II) acid to the dispersion liquid after the first step was prepared, and the pH was adjusted to 10 to 12, and the mixed liquid was stirred at a predetermined temperature for a predetermined time.

(Third Step)

A water soluble reducing agent was added to the mixed liquid after the second step, and palladium ions in the mixed liquid were subjected to reduction treatment to obtain a core particle-supported carbon "Pd/C" powder.

<Measurement of supporting ratio (ICP analysis)>

For this core-shell catalyst A, the Pt supporting ratio (wt %) and the Pd supporting ratio (wt %) were determined by the following methods:

The core-shell catalyst A was immersed in aqua regia to dissolve the metal. The carbon as the insoluble component was then removed from the aqua regia. Next, the aqua regia from which the carbon was removed was analyzed by ICP.

As a result of the ICP analysis, this core-shell catalyst had the Pt supporting ratio of 18.4 wt % and the Pd supporting ratio of 24.2 wt %.

<Surface Observation and Structural Observation of Electrode Catalyst>

For this core-shell catalyst AN STEM-HAADF images and EDS elemental mapping images were confirmed. As a result, there was confirmed the configuration that the catalyst particles having the core-shell structure in which the layer of the shell portion composed of Pt is formed on at least a part of the surface of the particles of the core portion composed of Pd are supported on the carbon carrier.

To observe the three-dimensional structure of the core-shell catalyst A, the measurement of electronic warfare tomography with STEM was carried out under the following conditions.

Figure 14:
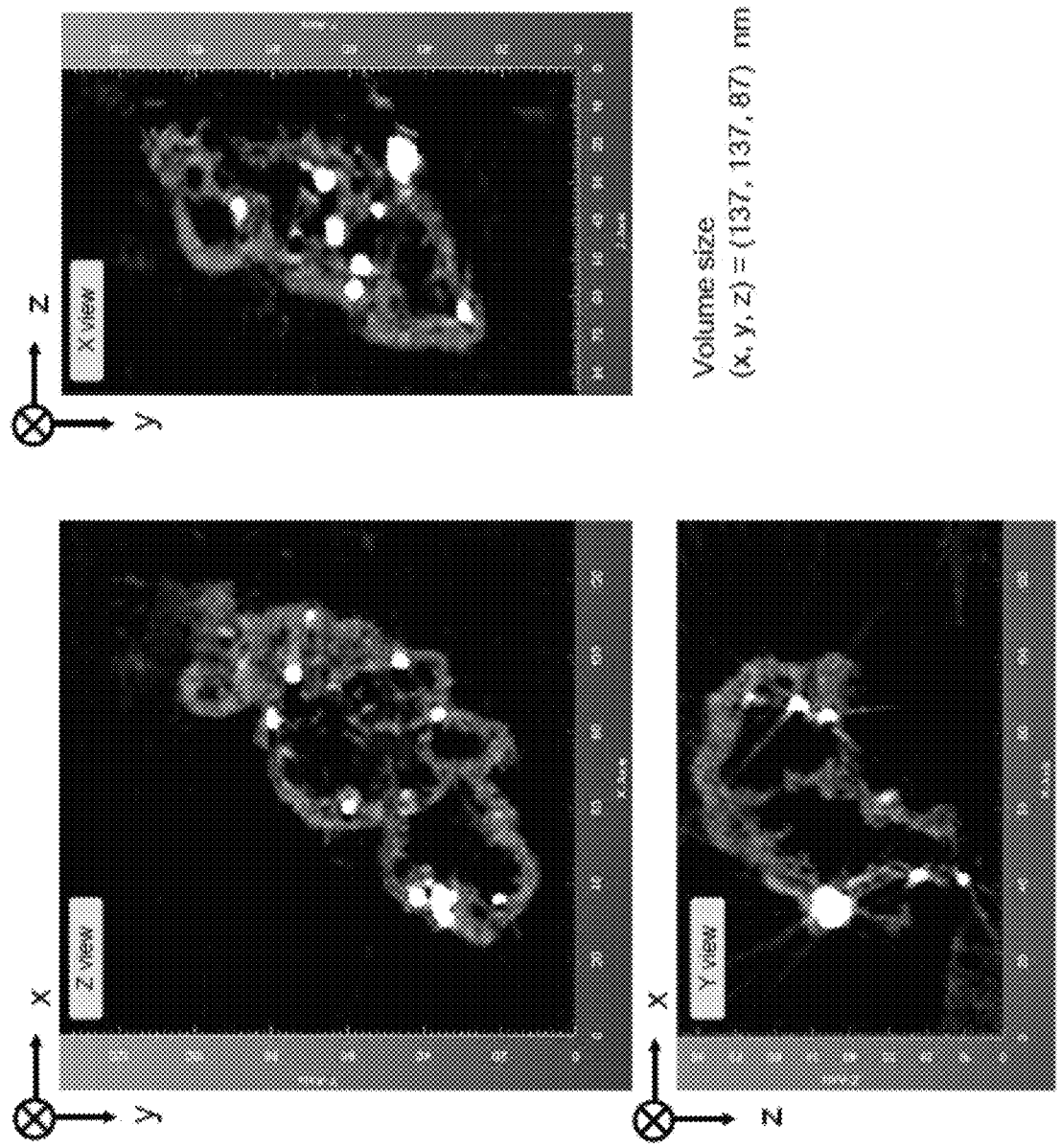
FIG. 14 is an STEM image showing 3D-electron beam tomography (electron tomography) measurement conditions (volume size) using an STEM of the electrode catalyst of Example 1.

STEM apparatus: JEM-ARM200F Atomic Resolution Analytical Electron Microscopy Made by JEOL Data analysis software: 3D reconfiguration software Composer, 3D data visualization software Visualizer-kai by System Infrontia, image analysis software Colorist Measurement conditions
Acceleration voltage: 60 kV
Observation magnification 800,000 to 1,000,000 times
Tilt angle of the measurement sample: −80° to +80°
Tilt step angle of the measurement sample: 2°
Pixel Count 512×512 pixels 512×512 pixels
Pixel size: 0.350-0.500 nm/pixel
Volume Size: as shown in FIG. 14.

With respect to the core-shell catalyst A, by image analysis of a three dimensional reconstructed image (3D-STEM image) obtained by electron beam tomography (electron tomography) measurement using an STEM (scanning transmission electron microscopy), the Pt/Pd catalyst particles (hereinafter, inner particles) present inside the carbon carrier and the Pt/Pd catalyst particles (hereinafter, outer particles) present on the surface portion of the carbon carrier were separated, and the particle size distribution of the Pt/Pd catalyst in each region was calculated.

Figure 15:
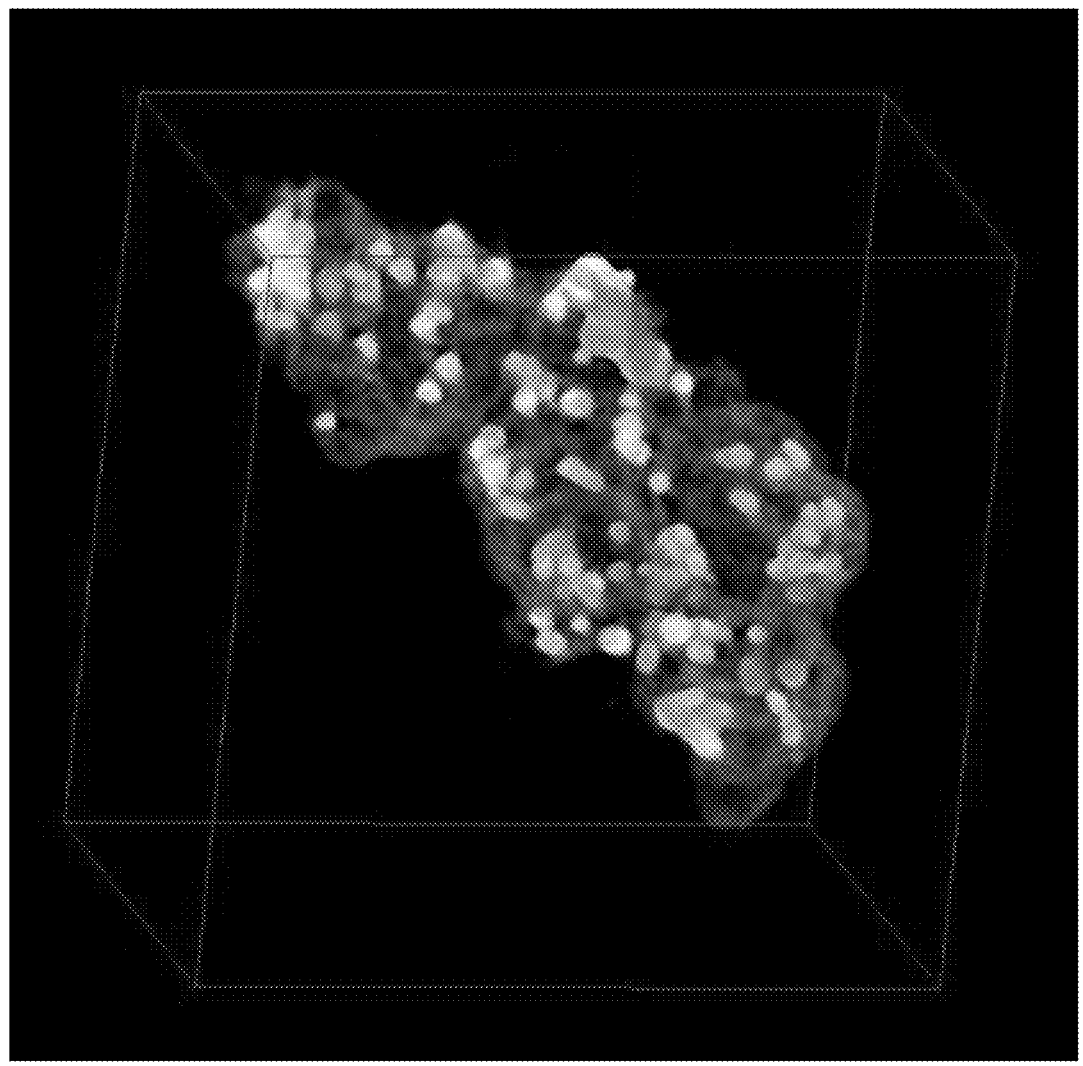
FIG. 15 is a 3D-STEM image (three-dimensional reconstructed image) of the catalyst of Example 1.

A three-dimensional reconstructed image (3D-STEM image) of the core-shell catalyst A is shown in FIG. 15.

Figure 16:
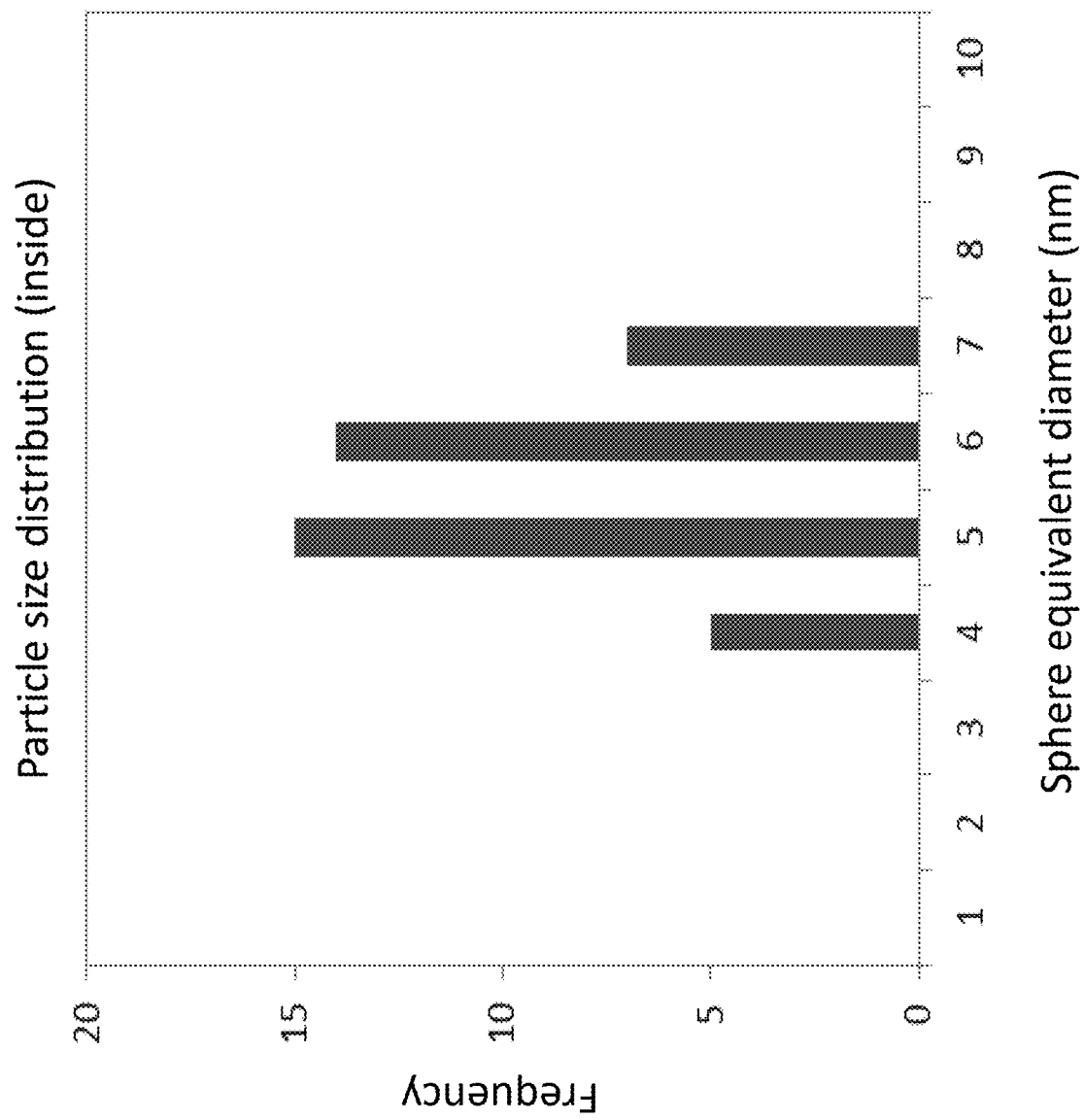
FIG. 16 is a graph showing the particle size distribution of the inner particles among the catalyst particles obtained by image analysis of the 3D-STEM image of the catalyst of Example 1 shown in FIG. 15.
Figure 17:
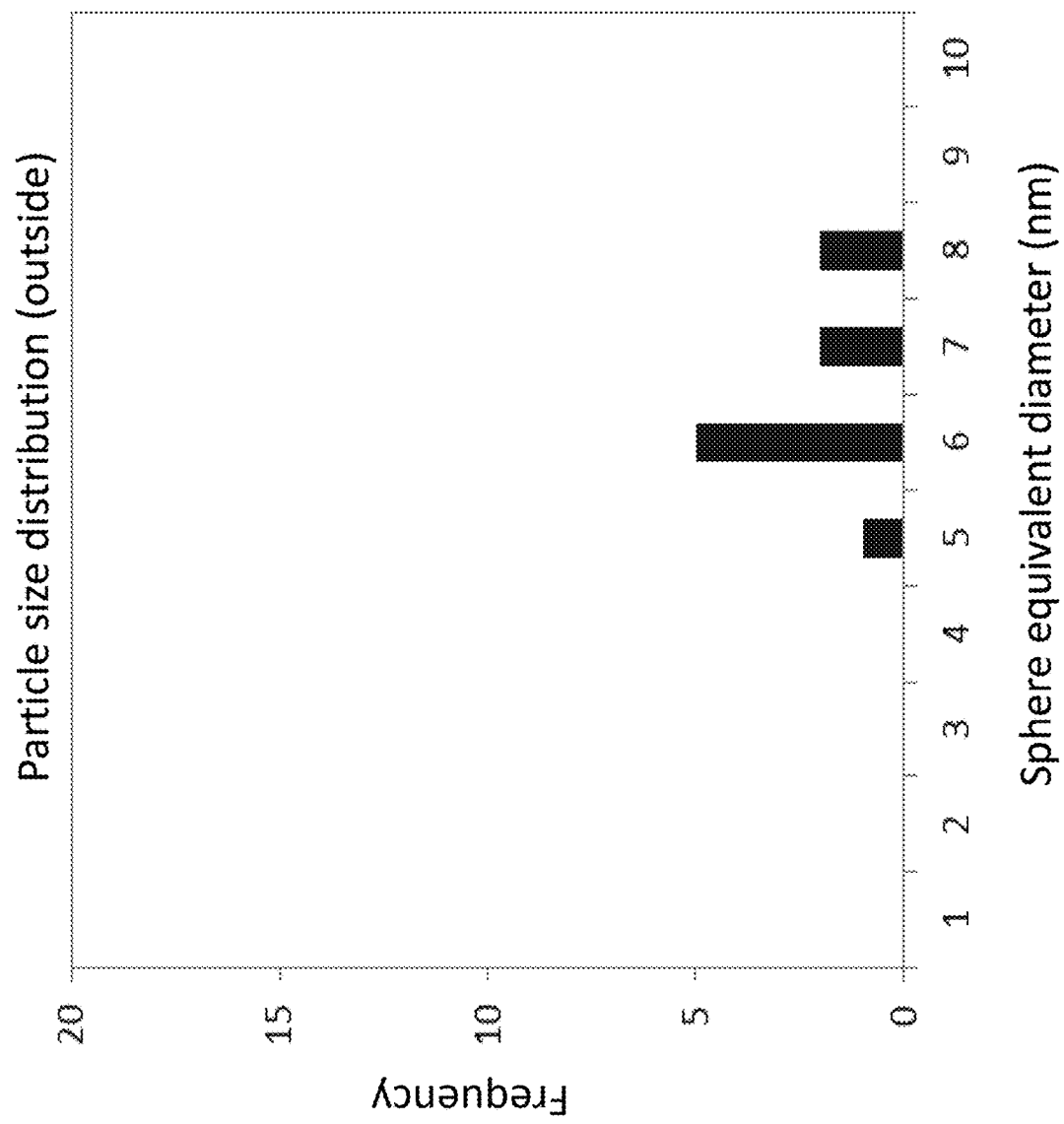
FIG. 17 is a graph showing the particle size distribution of the outer particles among the catalyst particles obtained by image analysis of the 3D-STEM image of the catalyst of Example 1 shown in FIG. 15.

The particle size analysis results of the inner particles and the outer particles obtained by the image analysis are shown in FIGS. 16 and 17. The 3D-STEM image was obtained by reconstructing a plurality of two-dimensional STEM images obtained by stepwise tilting the sample stage under the above measuring conditions.

And, the image analysis (particle size analysis) of three-dimensional reconstructed image (3D-STEM image) was carried out by the following procedures. The regions of the catalytic particles were first selected from the three-dimensional reconstructed images, and the respective catalytic particles were labeled (not shown). Next, the sphere equivalent diameter was calculated from the volume of the labeled Pt particles, and the particle size distribution (FIG. 16 and FIG. 17) was obtained.

Here, the sphere equivalent diameter was calculated by rounding up the value below the decimal point (value below 1 nm) using the unit of nm.

For the core-shell catalyst A, the ratio of the catalyst particles supported inside the mesopores of the carrier and the ratio of the catalyst particles supported outside the mesopores of the carrier were determined. The values of D1, D2, N1, and N2 were also obtained. The results are shown in Table 1 and Table 2.

Furthermore, the mean particle size of the catalyst particles of the core-shell catalyst A measured from the STEM image was 5.5 nm.

(2) Production of a Core-Shell Catalyst for Use in the Cathode of the MEA of Example 2

["Pt/Pd/C" Powder Having a Shell Part Composed of Pt Formed on Pd/C]

The "Pt/Pd/C" powder {Pt supporting ratio of 18.4 wt % (ICP analytical result), trade name "NE-K10218-BC", manufactured by N.E. CHEMCAT Co., Ltd.} in which the shell portion composed of Pt is formed on Pd of particles of "Pd/C" powder described below was prepared as the core-shell catalyst (hereinafter, "core-shell catalyst B).

This Pt/Pd/C powder was prepared by using a Pd/C powder described below, forming membrane composed of Cu on the surface of the core particles composed of Pd of the Pd/C by a common Cu-UPD method, and then proceeding the galvanic substitution reaction of Cu and Pt using potassium platinate.

[Core Particle Supported Carbon "Pd/C" Powder]

A Pd/C powder {Pd supporting ratio of 30 wt %, trade name "NE-K00230-C", manufactured by N.E. CHEMCAT Co., Ltd.)} in which core particles composed of Pd were supported on carbon black powder was prepared.

This Pd/C powder was prepared by the following procedures.

(First Step (Carrier Pretreatment Step))

A dispersion liquid in which commercially available hollow carbon carrier {manufactured by Lion Co., Ltd., trade name "Carbon ECP" (Ketjen Black EC300J), a specific surface area of 750 to 800 m$^2$/g} was dispersed in ultrapure water was held at 90 to 99° C. for 1.5 hours while stirring (although a not boiled state was retained).

Note that "ultrapure water" used in this first step (carrier pretreatment step) was a water having a specific resistance R (reciprocal of electric conductivity measured by a JIS standard test method (JIS K0552)) represented by the following the formula (3) of 3.0M Ωcm or more. In addition, ultrapure water had a water quality equivalent to or higher than that of A3 specified in JISK0557 Water for Testing Water and Wastewater.

This ultrapure water was produced using an ultrapure water producing apparatus "Milli-Q Series" (manufactured by Merck Co., Ltd.) and "Elix UV Series" (manufactured by Nippon Millipore Co., Ltd.)

$$R=1/p \qquad (3)$$

In the above general the formula (3), R represents a specific resistance, and p represents an electric conductivity measured by a JIS standard test method (JIS K0552).

(Second Step)

A mixed liquid obtained by adding sodium tetrachloropalladium (II) acid to the dispersion liquid after the first step was prepared, and the pH was adjusted to 3 to 4, and the mixture was stirred by holding a predetermined temperature.

(Third Step)

After the mixture solution after the second step was allowed to stand for 12 hours, the pH of the mixture solution was adjusted to 8 to 9 Then, a water-soluble reducing agent was added, and palladium ions in the mixed liquid were subjected to reduction treatment to obtain a core-particle-supported carbon "Pd/C" powder.

<Measure of Supporting Ratio (ICP Analysis)>

For this core-shell catalyst B, the Pt supporting ratio (wt %) and the Pd supporting ratio (wt %) were determined by the following methods.

The core-shell catalyst B was immersed in aqua regia to dissolve the metal. The carbon as the insoluble component was then removed from the aqua regia. Next, the aqua regia from which the carbon was removed was analyzed by ICP.

As a result of the ICP analysis, the core-shell catalyst had the Pt supporting ratio of 18.4 wt % and the Pd supporting ratio of 24.2 wt %.

<Surface Observation and Structural Observation of Electrode Catalyst>

For this core-shell catalyst B, STEM-HAADF image and EDS elemental mapping image were confirmed. As a result, there was confirmed the configuration that the catalyst particles having the core-shell structure in which the layer of the shell portion composed of Pt was formed on at least a part of the surface of the particles of the core portion composed of Pd are supported on the carbon carrier.

To observe the three-dimensional structure of the core-shell catalyst B, the measurement of electronic warfare tomography with STEM was carried out under the following conditions.

STEM apparatus: JEM-ARM200F Atomic Resolution Analytical Electron Microscopy Made by JEOL Data analysis software: 3D reconfiguration software Composer, 3D data visualization software Visualizer-kai by System Infrontia, image analysis software Colorist Measurement conditions Acceleration voltage: 60 kV Observation magnification 800,000 to 1,000,000 times Tilt angle of the measurement sample: −80° to +80°

Tilt step angle of the measurement sample 2°

Pixel Count 512×512 pixels 512×512 pixels

Pixel size: 0.350-0.500 nm/pixel

Figure 18:
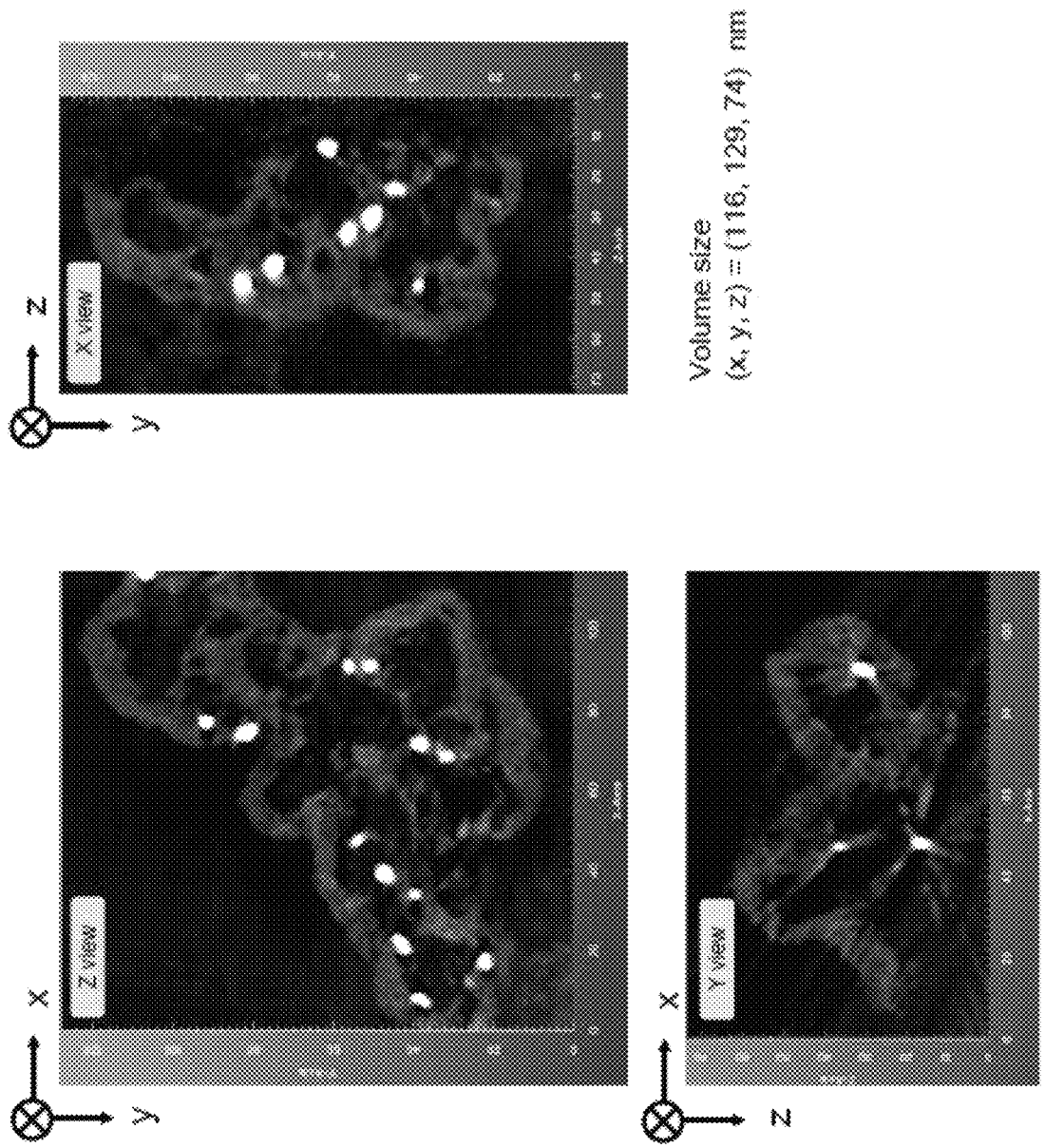
FIG. 18 is an STEM image showing 3D-electron beam tomography (electron tomography) measurement conditions (volume size) using the STEM of the catalyst of Example 2.

Volume Size: as shown in FIG. 18.

With respect to the core-shell catalyst B, by image analysis of a three dimensional reconstructed image (3D-STEM image) obtained by electron beam tomography (electron tomography) measurement using an STEM (scanning transmission electron microscopy), the Pt/Pd catalyst particles (hereinafter, internal particles) present inside the carbon carrier and the Pt/Pd catalyst particles (hereinafter, outer particles) present on the surface portion of the carbon carrier were separated, and the particle size distribution of the Pt/Pd catalyst particles in the respective regions was calculated.

Figure 19:
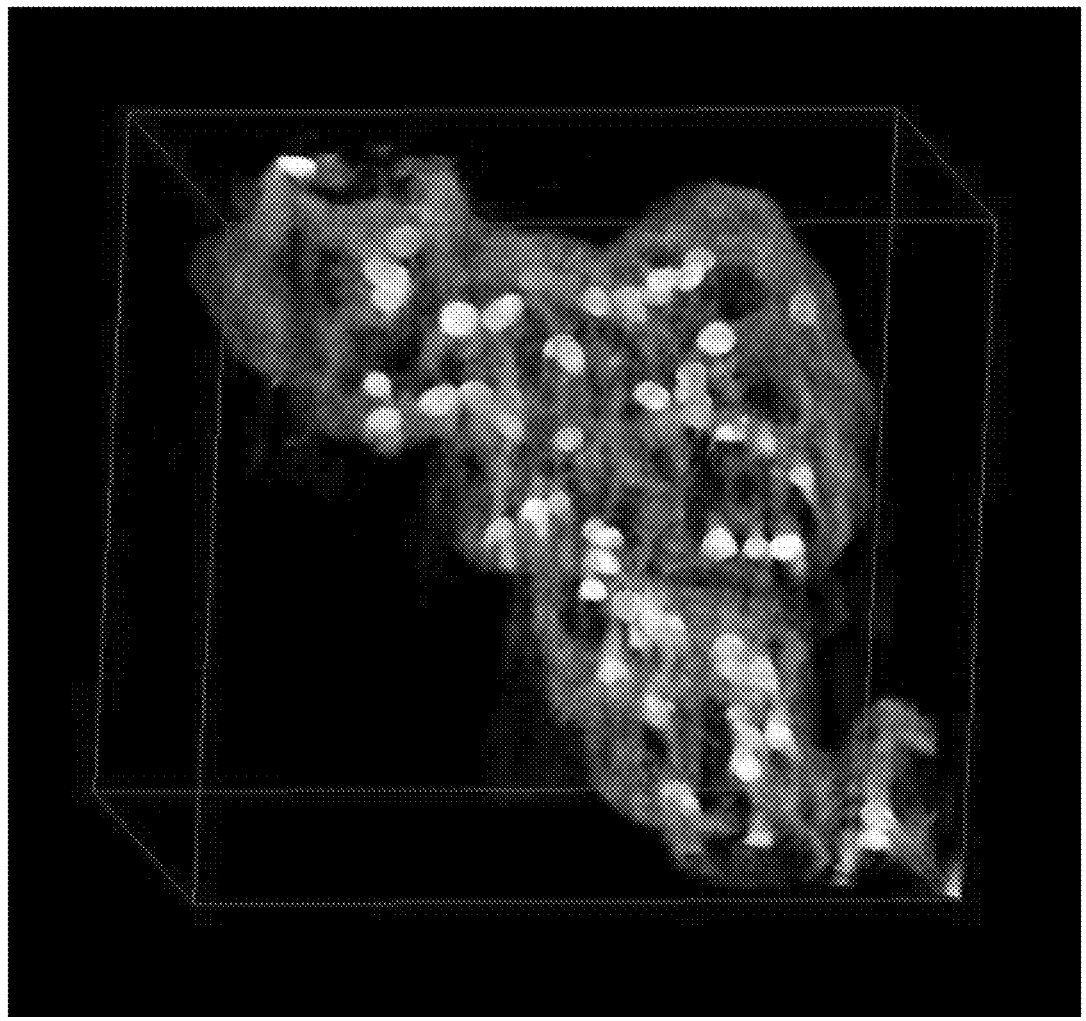
FIG. 19 is a 3D-STEM image (three-dimensional reconstructed image) of the catalyst of Example 2.

A three-dimensional reconstructed image (3D-STEM image) of the core-shell catalyst B is shown in FIG. 19.

The particle size analysis results of the internal particles and the outer particles were obtained in the same manner as in Example 1 by image analysis (not shown). The 3D-STEM image was obtained by reconstructing a plurality of two-dimensional STEM images obtained by stepwise tilting the sample stage under the above measuring conditions.

And, image analysis (particle size analysis) of three-dimensional reconstructed image (3D-STEM image) was carried out by the following procedures. The regions of the catalytic particles were first selected from three-dimensional reconstructed images, and the respective catalytic particles were labeled (not shown). Next, the sphere equivalent diameter was calculated from the volume of the labeled Pt particles, and the particle size distribution (not shown) was determined.

Here, the sphere equivalent diameter was calculated by rounding up the value below the decimal point (value below 1 nm) using the unit of nm.

For the core-shell catalyst B, the ratio of the catalyst particles supported inside the mesopores of the carrier and the ratio of the catalyst particles supported outside the mesopores of the carrier were determined. The values of D1, D2, N1, and N2 were also obtained. The results are shown in Table 1 and Table 2.

Furthermore, the mean particle size of the catalyst particles of the core-shell catalyst B measured from STEM image was 4.2 nm.

(3) Preparation of the Core-Shell Catalyst Used for the Cathode of the MEA of Comparative Example 1

["Pt/Pd/C" Powder Having a Shell Portion Composed of Pt Formed on Pd/C]

The "Pt/Pd/C" powder {Pt supporting ratio 16.1 wt % (ICP analytical result), trade name "NE-F10216-BC", manufactured by N.E. CHEMCAT Co., Ltd.} in which a shell portion composed of Pt was formed on Pd of particles of the "Pd/C" powder described below was prepared as the core-shell catalyst (hereinafter, referred to as "core-shell catalyst C").

This Pt/Pd/C powder was prepared by using a Pd/C powder described below, forming membrane composed of Cu on the surface of the core particles composed of Pd of the Pd/C by a common Cu-UPD method, and then proceeding the galvanic substitution reaction of Cu and Pt using potassium platinate.

[Core Particle Supported Carbon "Pd/C" Powder]

A Pd/C powder {Pd supporting ratio of 30 wt %, trade name "NE-F00230-C", manufactured by N.E. CHEMCAT Co., Ltd.)} in which core particles composed of Pd were supported on carbon black powder was prepared.

This Pd/C powder was not subjected to the process of the first step (carrier pretreatment step) employed in the preparation of the Pd/C powder used in Example 1 described above.

Namely, the preparation was carried out by preparing a mixture liquid of a commercial solid carbon carrier (Electrochemical Co., Ltd., trade name "Denka Black" (registered trademark), specific surface area 750-800 $m^2$ g-1), sodium tetrachloropalladium (II) acid and ultrapure water, adding thereto a reducing agent to obtain a solution and, then, reducing the palladium ion in the solution. The ultrapure water was used which has the same water quality as that employed for the preparation of the Pd/C powder of Example 1.

<Measurement of Supporting Ratio (ICP Analysis)>

For this core-shell catalyst C, the Pt supporting ratio (wt %) and the Pd supporting ratio (wt %) were determined by the following methods.

The core-shell catalyst C was immersed in aqua regia to dissolve the metal. The carbon as the insoluble component was then removed from the aqua regia. Next, the aqua regia from which the carbon was removed was analyzed by ICP.

As a result of the ICP analysis, the core-shell catalyst had the Pt supporting ratio of 16.8 wt % and the Pd supporting ratio of 25.0 wt %.

<Surface Observation and Structural Observation of Electrode Catalyst>

For this core-shell catalytic C, STEM-HAADF and EDS elemental mapping images were confirmed. As a result, there was confirmed the configuration that the catalyst particles having the core-shell structure in which the layer of the shell portion composed of Pt is formed on at least a part of the surface of the particles of the core portion composed of Pd are supported on the conductive carbon carrier.

In addition, in order to observe the three-dimensional structure of the core-shell catalyst C, the determination of the electronic combat tomography by STEM was carried out under the following conditions.

STEM apparatus: JEM-ARM200F Atomic Resolution Analytical Electron Microscopy Made by JEOL Data analysis software: 3D reconfiguration software Composer, 3D data visualization software Visualizer-kai by System Infrontia, image analysis software Colorist Measurement conditions Acceleration voltage: 60 kV Observation magnification 800,000 to 1,000,000 times Tilt angle of the measurement sample: −80° to +80°

Tilt step angle of the measurement sample 2°

Pixel Count 512×512 pixels 512×512 pixels

Pixel size: 0.350-0.500 nm/pixel

Figure 20:
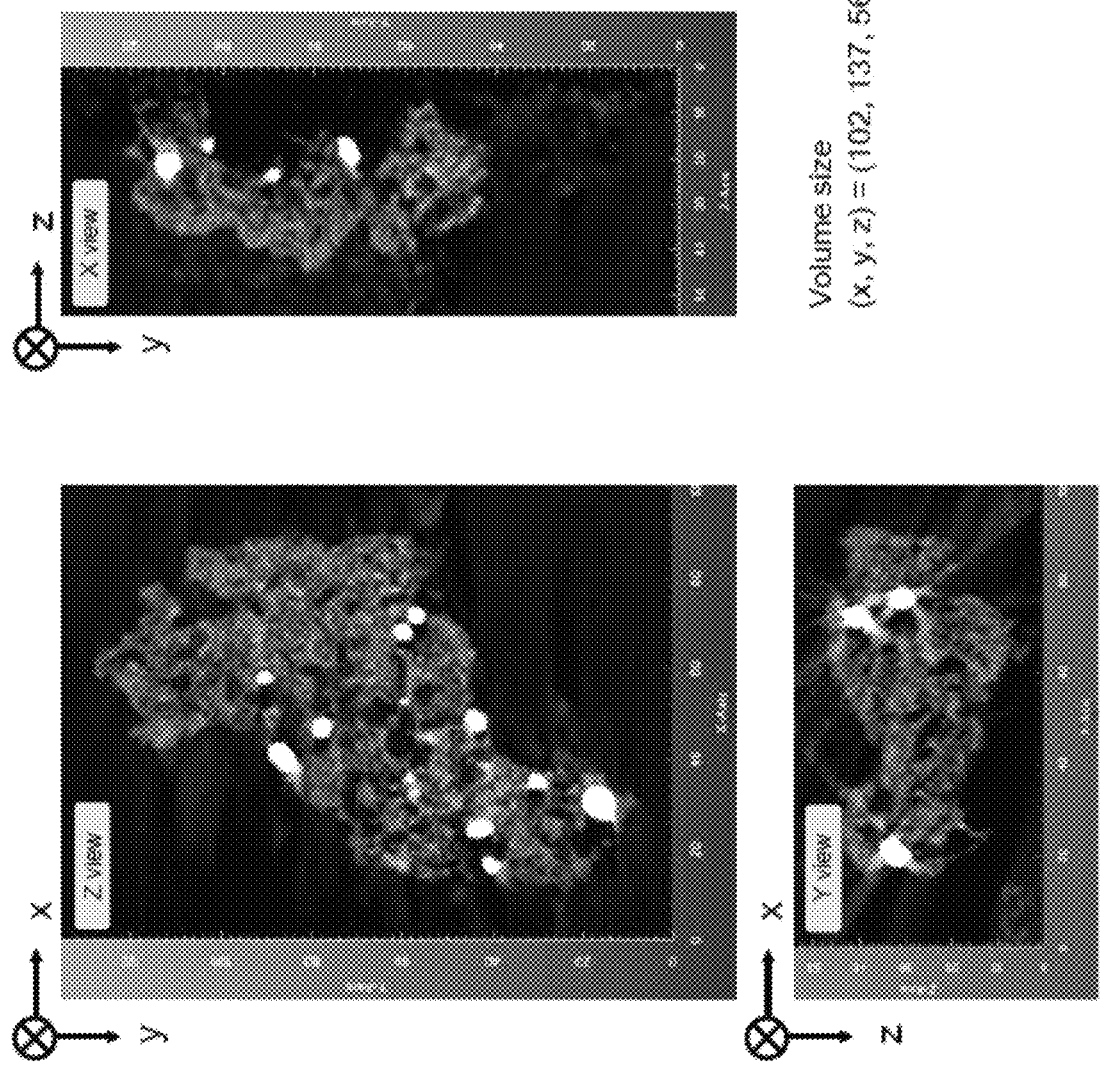
FIG. 20 is an STEM image showing 3D-electron beam tomography (electron tomography) measurement conditions (volume size) using the STEM of the catalyst of Comparative Example 1.

Volume Size: as shown in FIG. 20.

With respect to the core-shell catalyst C, by image analysis of a three dimensional reconstructed image (3D-STEM image) obtained by electron beam tomography (electron tomography) measurement using an STEM (scanning transmission electron microscopy), the Pt/Pd catalyst particles (hereinafter, internal particles) present inside the carbon carrier and the Pt/Pd catalyst particles (hereinafter, outer particles) present on the surface portion of the carbon carrier were separated, and the particle size distribution of the Pt/Pd catalyst particles in the respective regions was calculated.

Figure 21:
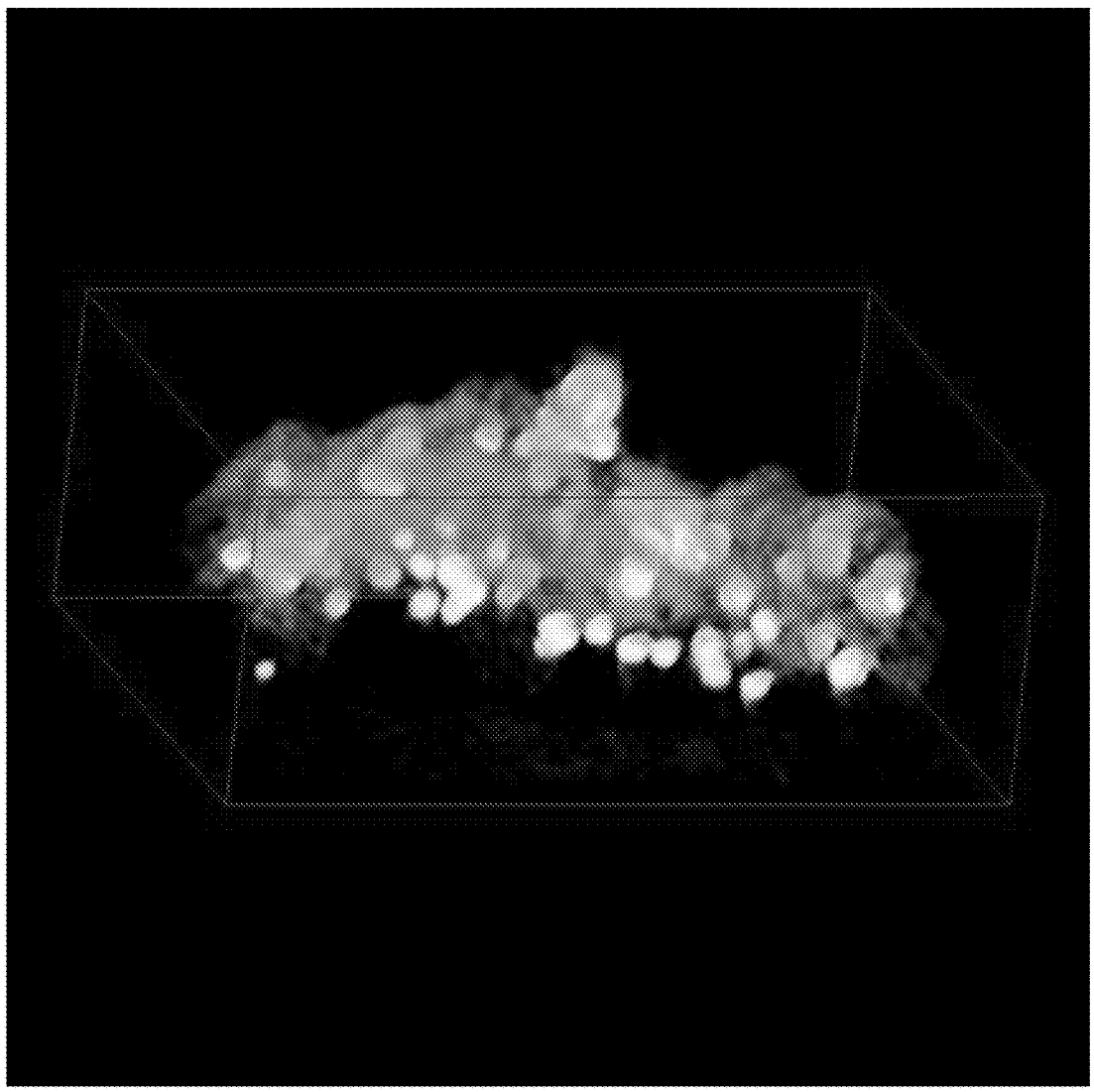
FIG. 21 is a 3D-STEM image (three-dimensional reconstructed image) of the catalyst of Comparative Example 1

A three-dimensional reconstructed image (3D-STEM image) of the core-shell catalyst C is shown in FIG. 21.

Figure 22:
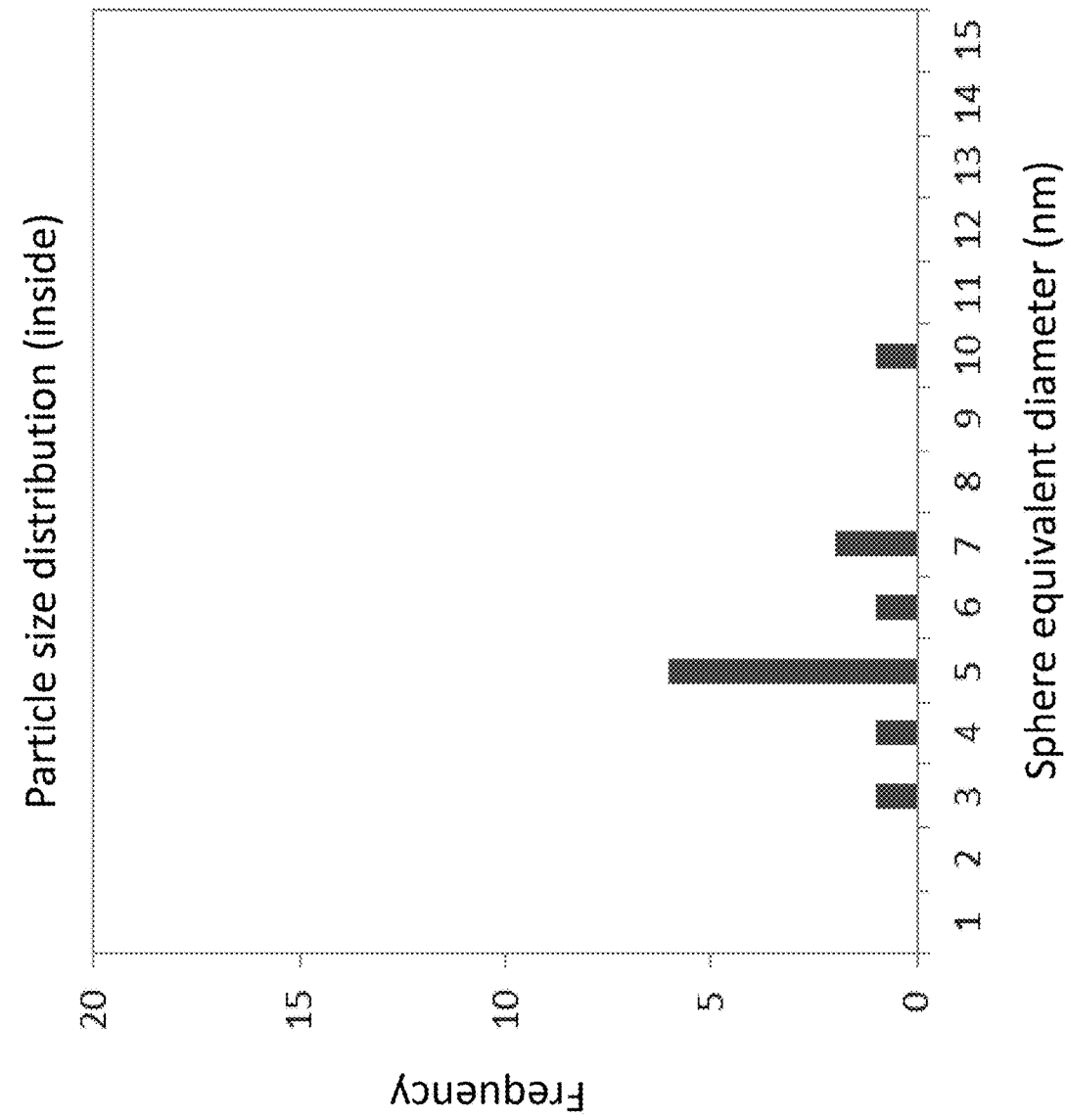
FIG. 22 is a graph showing the particle size distribution of the inner particles among the catalyst particles obtained by image analysis of the 3D-STEM image of the catalyst of Comparative Example 1 shown in FIG. 21.
Figure 23:
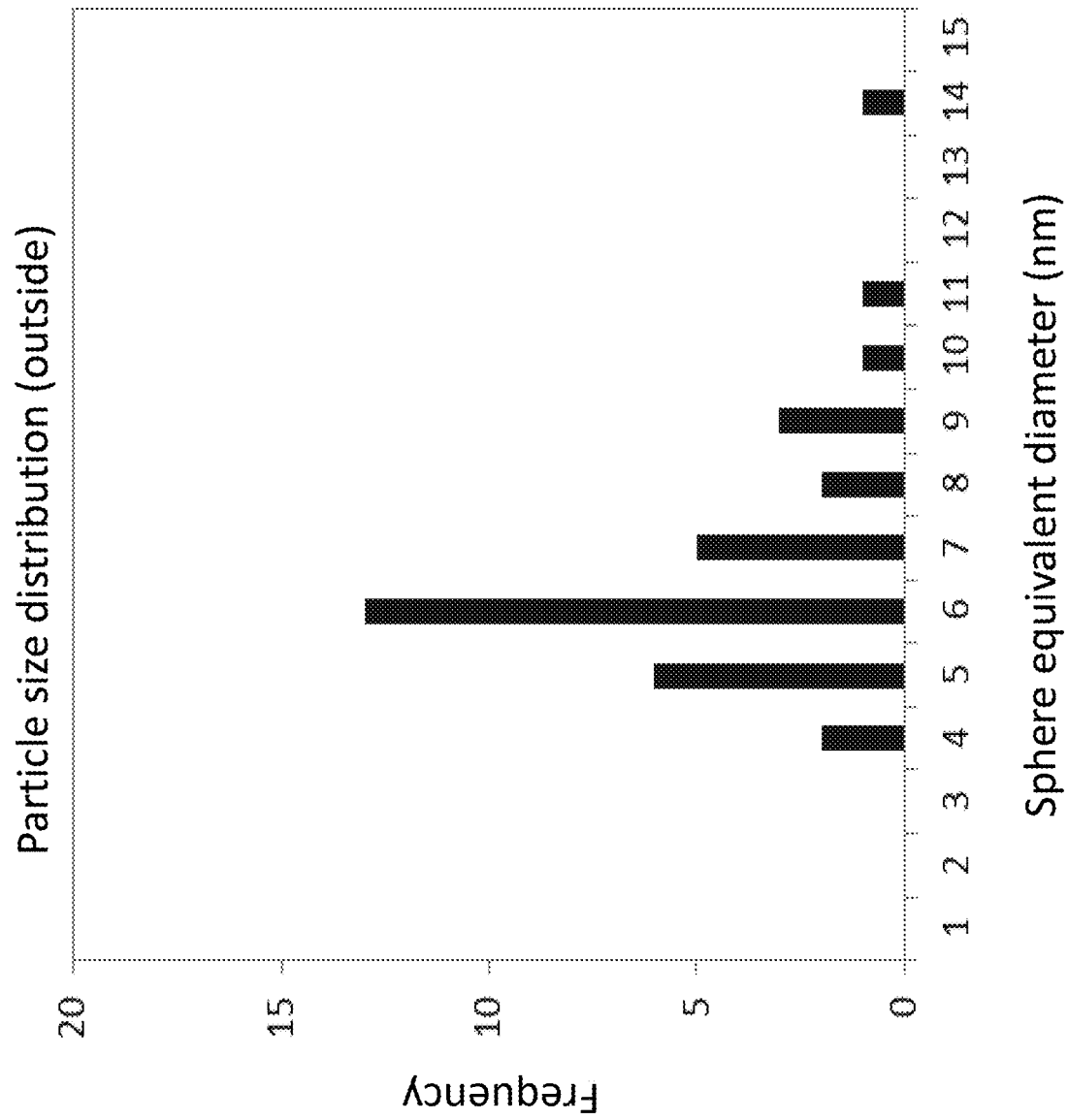
FIG. 23 is a graph showing the particle size distribution of the outer particles among the catalyst particles obtained by image analysis of the 3D-STEM image of the catalyst of Comparative Example 1 shown in FIG. 21.

The particle size analysis results of the internal particles and outer particles obtained by image analysis are shown in FIGS. 22 and 23. The 3D-STEM image was obtained by reconstructing a plurality of two-dimensional STEM images obtained by stepwise tilting the sample stage under the above measuring conditions.

And, image analysis (particle size analysis) of three-dimensional reconstructed image (3D-STEM image) was carried out by the following procedures. The regions of the catalytic particles were first selected from three-dimensional reconstructed images, and the respective catalytic particles were labeled (not shown). Next, the sphere equivalent diameter was calculated from the volume of the labeled Pt particles, and the particle size distribution (FIGS. 22 and 23) was obtained.

Here, the sphere equivalent diameter was calculated by rounding up the value below the decimal point (value below 1 nm) using the unit of nm.

For the core-shell catalyst C, the ratio of the catalyst particles supported inside the mesopores of the carrier and the ratio of the catalyst particles supported outside the mesopores of the carrier were determined. The values of D1, D2, N1, and N2 were also obtained. The results are shown in Table 1 and Table 2.

Furthermore, the mean particle size of the catalyst particles of the core-shell catalyst C measured from STEM image was 6.0 nm.

Figure 13:
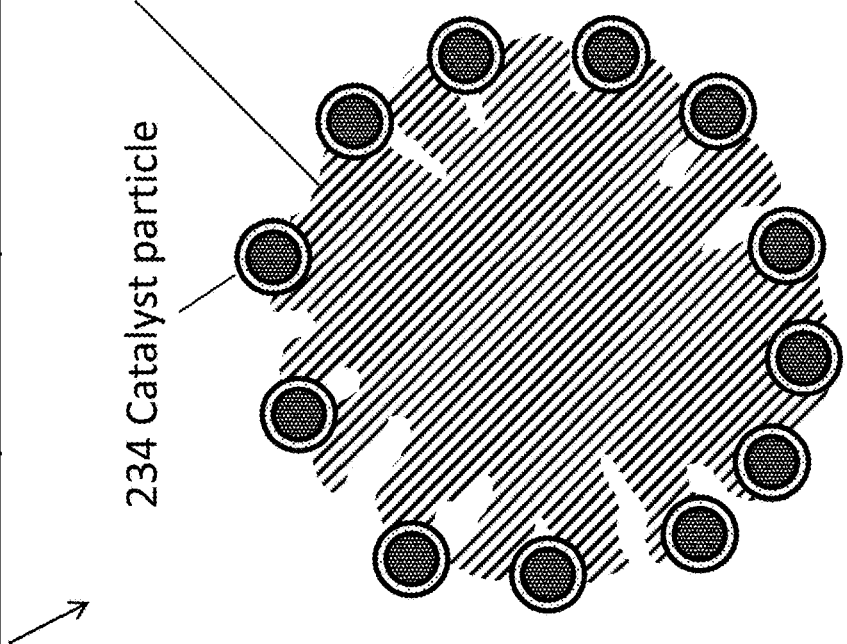
FIG. 13 is a schematic cross-sectional view showing an electrode catalyst of Comparative Example 1.

From the observation results of the STEM, the present inventors have inferred that the electrode catalyst of Comparative Example 1 has the configuration shown in FIG. 13. FIG. 13 is a schematic cross-sectional view showing an electrode catalyst (core-shell catalyst C) of Comparative Example 1. The electrode catalyst (core-shell catalyst C) 204 has a structure in which catalyst particles 234 are supported on the surface of a solid carbon carrier 224 having fewer mesopores.

(4) Preparation of Pt/C Catalysts for Use in the Cathode of the MEA of Comparative Example 2

As a Pt/C catalyst, the Pt/C catalyst (trade name: "SA50BK") having the Pt supporting ratio of 50 wt % manufactured by N.E. CHEMCAT was prepared. Note that, for the carrier of this Pt/C catalyst, a commercially available hollow carbon carrier {trade name "Carbon ECP" (registered trademark) (Ketjen Black EC300J), manufactured by Lion Co., Ltd., specific surface area 750 to 800 $m^2/g$} was used.

For this Pt/C catalyst, the above-mentioned core-shell catalyst and XRD-analysis were carried out. As a result, the average value of crystallite size was 2.6 nm.

(II) Preparation of P/C Catalysts for Use in the Anodes of MEAs of Examples 1 to 2 and Comparative Examples 1 to 2

The same Pt/C catalyst as Pt/C catalyst used for the cathode of the MEA of Comparative Example 2 was used as the P/C catalyst used for the anode of the MEA of Examples 1 to 2 and Comparative Examples 1 to 2.

Example 1

In the following procedures, an MEA with the same configuration as the MEA 10 shown in FIG. 1.

(1) Preparation of the Cathode

Cathode GDL

Carbon paper (trade name "TGP-H-60" manufactured by Toray Co., Ltd) was prepared as the GDL.

Ink for Forming Cathode MPL

Into a ball mill container made by Teflon (registered trademark) containing a Teflon (registered trademark) in which balls made of Teflon (registered trademark) were added, 1.5 g of carbon powder (trade name "Denkablack" manufactured by Electrochemical Industry Co., Ltd.), 1.1 g of ion-exchanged water, and 6.0 g of a surfactant (trade name "Triton" (35 wt % water solution) manufactured by Dow chemical Co., Ltd.) were charged and mixed.

Next, 1.75 g of polytetrafluoroethylene (PTFE) dispersion (trade name "31-JR" manufactured by Mitsui DuPont Fluorochemical Co., Ltd.) was put into the ball mill container and mixed. Thus, an ink for forming cathode MPL was produced.

Cathode MPL

On one side of the GDL, an ink for forming cathode MPL was applied using a barcoder to form a coating film. Thereafter, the coating film was sufficiently dried in a dryer, and further subjected to a heat and pressure bonding treatment to prepare a laminate in which the MPL was formed on the GDL.

Ink for Forming Cathode Catalyst Layer

Into a ball mill container made of Teflon (registered trademark) containing a ball made of Teflon (registered trademark), the above-mentioned core-shell catalyst A, ion-exchanged water, a 10 wt % Nafion aqueous dispersion (trade name "DE1021CS" manufactured by DuPont Co., Ltd.) and glycerin were charged and mixed to prepare an ink for forming cathode catalyst layer. Note that this ink was adjusted to have a N/C=0.7. Further, the core-shell catalyst A was adjusted to have carbon:ion-exchanged water:glycerin=1:10:0.8 (mass ratio).

Cathode Catalyst layer (CL)

An ink for forming cathode catalyst layer described above was applied to the surface of the MPL of a laminate in which MPL was formed on MPL on the GDL described above by a bar coating method to form a coating film. This coating film was dried at room temperature for 30 minutes, and then dried at 60° C. for 1.0 hours to obtain a catalyst layer. In this way, a cathode which is a gas diffusion electrode was prepared. Note that the supporting amount of Pt supported on the catalyst layer of the cathode was set to be a numerical value shown in Table 1.

(2) Production of Anode

Anode GDL

As the GDL, carbon paper identical to that of the cathode was prepared.

Ink for Forming Cathode MPL

Into a ball mill container made by Teflon (registered trademark) containing a Teflon (registered trademark) in which balls made of Teflon (registered trademark) were added, 1.5 g of carbon powder (trade name "Denka black" manufactured by Electrochemical Industry Co., Ltd.), 1.0 g of ion-exchanged water 1.0 g, and 6.0 g of a surfactant (trade name "Triton" (35 wt % water solution) manufactured by Dow chemical Co., Ltd.) were charged and mixed.

Next, 2.5 g of a polytetrafluoroethylene (PTFE) dispersion (trade name "31-JR" manufactured by Mitsui DuPont Fluorochemical Co., Ltd.) was charged into the ball mill container and mixed. Thus, an ink for forming anode MPL was produced.

Anode MPL

The ink for forming anode MPL was applied to one side of the GDL using a barcoder to form a coating film. Thereafter, the coating film was sufficiently dried in a dryer, and further subjected to a heat and pressure bonding treatment to produce a laminate in which MPL was formed on the GDL.

Ink for Forming Anode Catalyst Layer

Into a ball mill container made by Teflon (registered trademark) containing a Teflon (registered trademark) in which balls made of Teflon (registered trademark) were added, SA50BK (Pt supporting ratio 50 wt %), ion-exchange water, 5 wt % Nafion alcohol dispersion (trade name "Nafion" 5 wt. % dispersion, product number 274704, manufactured by SIGMA-ALDRICH's) and glycerin were charged and mixed to prepare an ink for forming anode catalyst layer. Note that this ink was adjusted to have N/C=1.2. Further, SA50BK was adjusted to have carbon:ion-exchanged water:glycerin=1:6:4 (mass ratio).

Anode Catalyst Layer (CL)

An ink for forming anode catalyst layer described above was applied to the surface of an MPL of a laminate in which MPL was formed on MPL on the GDL described above by a bar coating method to form a coating film. This coating film was dried at room temperature for 30 minutes, and then dried at 60° C. for 1.0 hours to obtain a catalyst layer. In this way, an anode which is a gas diffusion electrode was produced. Note that the Pt supporting amount of the catalyst layer of the anode was set as a 0.3 mg/cm$^2$.

(3) Production of MEA

A polymer electrolyte membrane (trade name "Nafion NR212" manufactured by DuPont Co., Ltd.) was prepared. A laminate in which this polymer electrolyte membrane was arranged between the cathode and the anode was produced, and heated and pressed by a hot pressing machine to produce an MEA. Incidentally, the hot pressing was carried out with the conditions of 140° C. at 5KN for 5 minutes and, further, 140° C. at 25KN for 3 minutes.

Example 2

Each MEA was produced under the same conditions and procedures as in Example 1, except that the core-shell B described above was used instead of the core-shell A, and the composition of the ink for forming cathode catalyst layer and the applying conditions of the ink were adjusted so that the Pt supporting amount became a numerical value shown in Table 1, with respect to the cathode catalyst layer.

Comparative Example 1

Each MEA was produced under the same conditions and procedures as in Example 1, except that the core-shell C described above was used instead of the core-shell A, and the composition of the ink for forming cathode catalyst layer and the coating conditions of the ink were adjusted so that the Pt supporting amount became a numerical value shown in Table 1, with respect to the cathode catalyst layer.

Comparative Example 2

Each MEA was produced under the same conditions and procedures as in Example 1, except that the following conditions were changed with respect to the cathode catalyst layer.

In other words, in the preparation of the ink for forming cathode catalyst layer, the previously described P/C catalyst (trade name: "SA-50BK") was used instead of the core-shell catalyst A A 5 wt % Nafion alcohol dispersion (trade name "DE520CS"; containing 48 wt % of 1-propanol manufactured by DuPont Co., Ltd.) was used instead of 10 wt % Nafion aqueous dispersion.

The composition of the ink for forming cathode catalyst layer and the applying conditions of the ink were adjusted so that the Pt supported amount and the N/C had the numerical values shown in Table 1.

Carbon:ion-exchanged water:glycerin=1:10:1 (mass ratio) in the P/C catalyst (trade name: "SA50BH").

<Cell Performance Evaluation>

The cell performance of the MEA of Examples 1 to 2 and Comparative Examples 1 to 3 was carried out by the following cell performance evaluation method.

The MEAs of Examples 1 to 2 and Comparative Examples 1 to 3 were installed in a fuel cell unit cell evaluation device.

Next, the power generation reaction in the MEA was allowed to proceed under the following conditions.

The temperature of the unit cell (MEA) was set to 80° C. The anode was supplied with pure hydrogen humidified with saturated water vapor of 1.0 atm by adjusting the flow rate so that the utilization rate was 70%. Further, the cathode was supplied with pure oxygen humidified with saturated water vapor of 1.0 atm at 80° C. by adjusting the flow rate so that the utilization rate was 50%.

Evaluation of the unit cells (MEAs) was performed by controlling the current by an electronic loading device attached to the fuel cell unit cell evaluation device, and the current-voltage curves obtained by scanning the current values from 0 to 1.0 A/cm$^2$ were acquired as data.

The X-axis (current density) from the data of the current-voltage curves was plotted as a logarithmic scale to obtain a graph (not shown), and a current density value at a voltage 850 mV (current value per unit area of the electrode) was obtained.

By dividing the current density value thus obtained by the platinum weight per unit area of the cathode, it was calculated as the activity per unit weight (Mass.Act.) for platinum contained in the cathode, and was used as an indicator of the oxygen reduction ability of the catalyst contained in the cathode. The results are shown in Table 1. In Table 1, a result of comparing Mass.Act. obtained in the other examples and comparative examples as a relative value (relative ratio) using Mass.Act. obtained in Comparative Example 1 as a reference (1.0) is shown.

TABLE 1

| | Cathode catalyst configuration | Cathode Catalyst carrier | Ratio of catalyst particles supported inside the mesopores of cathode catalyst carrier | Relative value Mass. Act. @850 mV | Cathode Pt supporting amount g/cm² | Anode Pt supporting amount g/cm² |
|---|---|---|---|---|---|---|
| Example1 | Pt/Pd/C | Hollow | 57% | 6.3 | 0.10 | 0.30 |
| Example2 | Pt/Pd/C | Hollow | 80% | 9.7 | 0.10 | 0.30 |
| Comparative Example1 | Pt/Pd/C | Solid | 26% | 4.6 | 0.10 | 0.30 |
| Comparative Example2 | Pt/C | Hollow | Not measured | 1.0 | 0.10 | 0.30 |

TABLE 2

| | D1 (sphere equivalent diameter of particles exhibiting a maximum frequency among catalyst particles supported inside mesopores of carrier) nm | D2 (sphere equivalent diameter of particles exhibiting a maximum frequency among catalyst particles supported outside mesopores of carrier) nm | N1 (frequency of particles exhibiting a maximum frequency among catalyst particles supported inside mesopores of carrier)/N2 (frequency of particles exhibiting a maximum frequency among catalyst particles supported outside mesopores of carrier) |
|---|---|---|---|
| Example1 | 5 | 6 | 1.8 |
| Example2 | 4 | 5 | 3.0 |
| Comparative Example1 | 5 | 6 | 0.5 |
| Comparative Example2 | Not measured | Not measured | Not measured |

From the results shown in Table 1, it was clarified that the MEA of Examples 1 to 2 has a high Pt mass activity compared with the MEA of Comparative Examples 1 to 2.

In particular, the electrode catalyst of Example 2 (core-shell catalyst B) in which the ratio of catalyst particles (inner particles) supported inside the mesopore was 80% or more exhibited more better performance as compared with the electrode catalyst of Example 1 (core-shell catalyst A).

Figure 24:
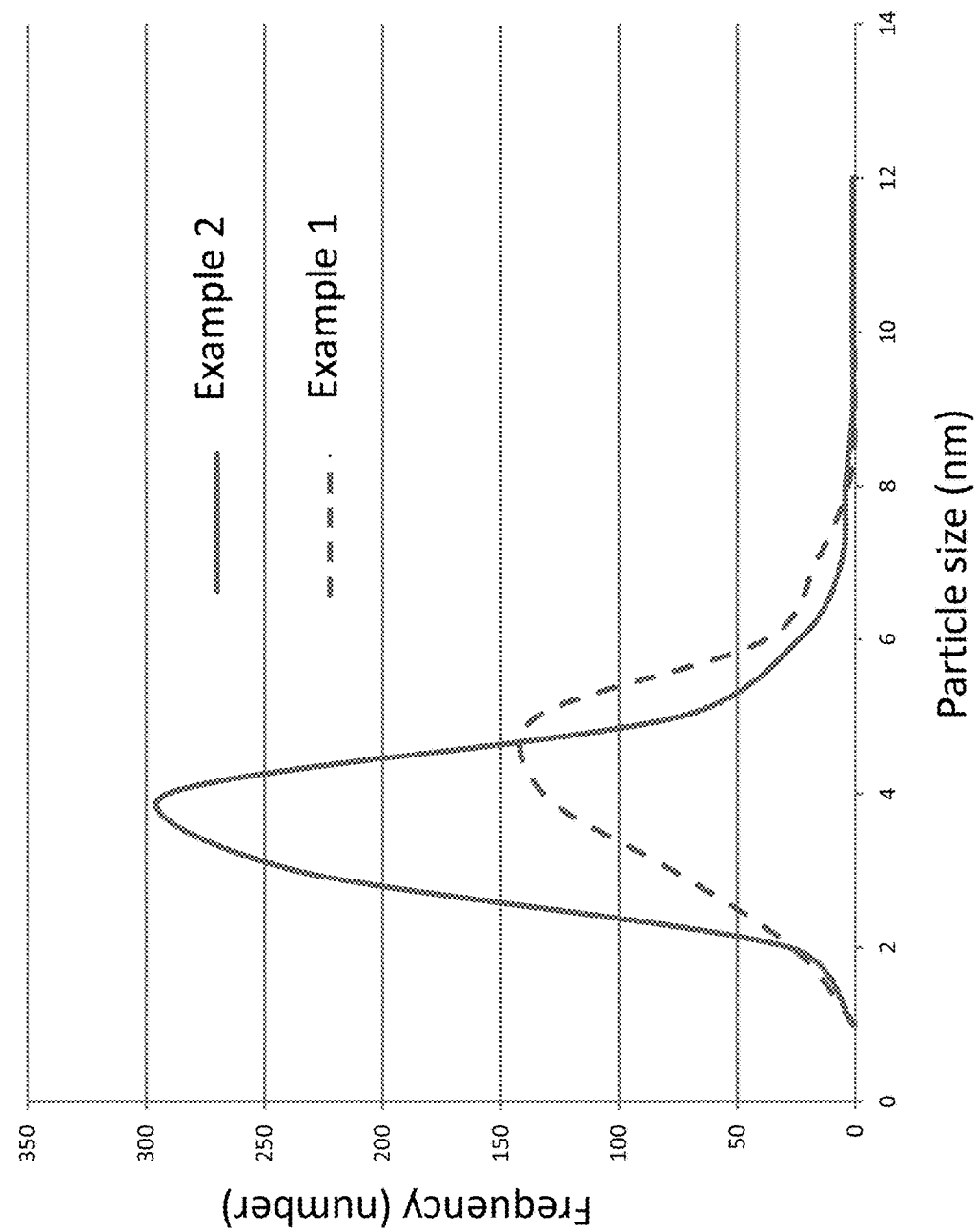
FIG. 24 is a graph showing a comparison result of the particle size distributions of the catalysts of Example 1 and Example 2.

FIG. 24 shows the comparative result of the particle size distribution obtained from the image analysis of 3D-STEM image of the electrode catalyst (core-shell catalyst A) of Example 1 and the electrode catalyst (core-shell catalyst B) of Example 2.

Figure 25:
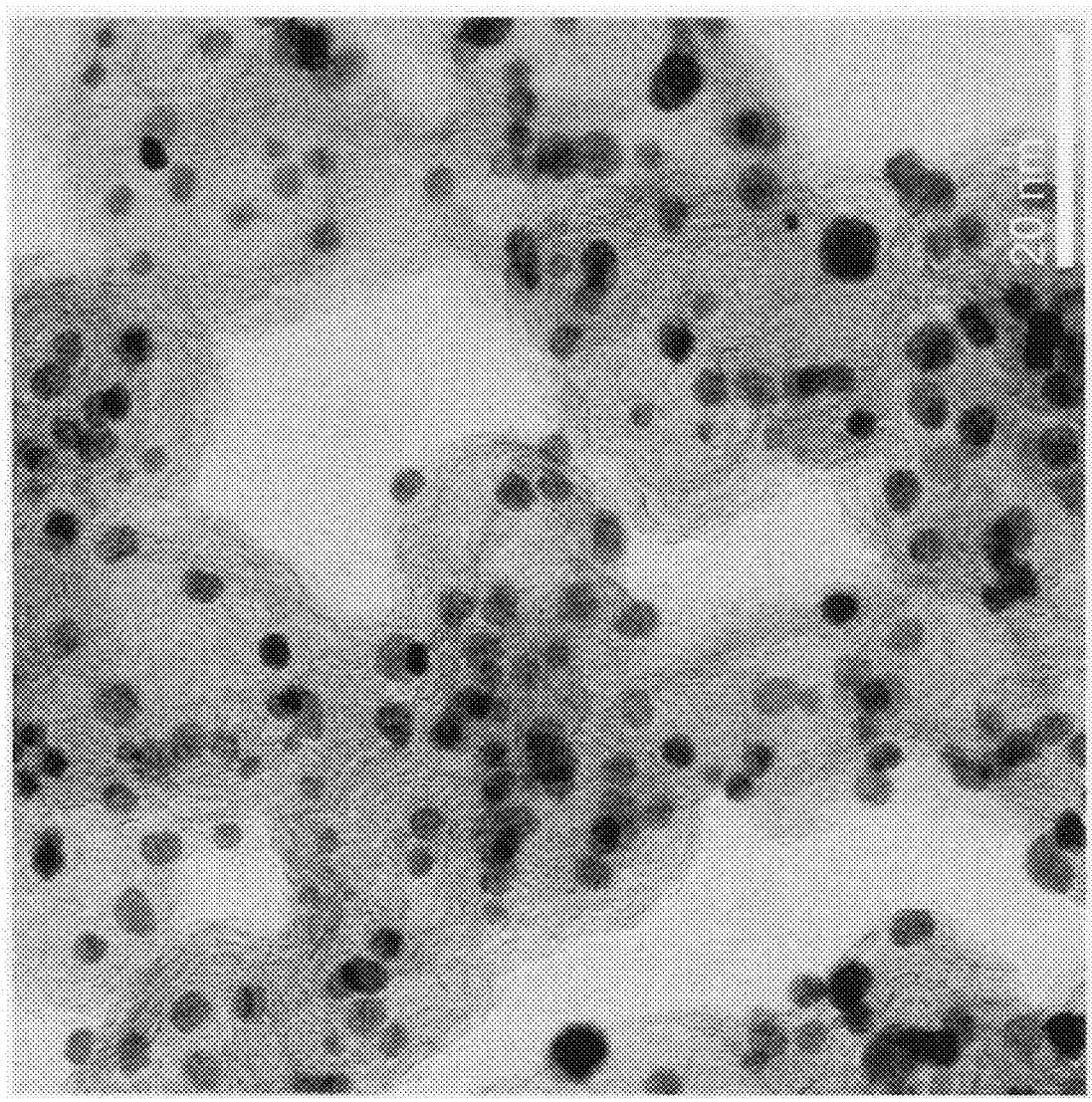
FIG. 25 is an STEM image (bright field) of the catalyst of Example 2.

FIG. 25 shows an STEM image (bright field) of the electrode catalyst of Example 2 (core-shell catalyst B).

As shown in FIGS. 24 and 25, it was confirmed that the electrode catalyst (core-shell catalyst B) of Example 2 has a state in which the particle size distribution of the catalyst particles is sharp and the particle size is overall small and the particle size variation of the catalyst particles is reduced as compared with the electrode catalyst (core-shell catalyst A) of Example 1. Thus, the present inventors infer that the electrode catalyst (core-shell catalyst B) of Example 2 has a better coating state of the Pt shell layer on the surface of the Pd core particles, and the catalyst particles having such a core-shell structure are supported more selectively in the inner pores of the carrier and, therefore, excellent activity is give.

INDUSTRIAL APPLICABILITY

The electrode catalyst of the present invention exhibits excellent catalytic activity. In addition, the GDE, CCM, MEA, and fuel cell stack including the catalyst layer of the present invention exhibit excellent cell properties that can contribute to cost reduction of PEFC. Therefore, the present invention can be applied not only to the electrical equipment industry such as a fuel cell, a fuel cell vehicle and a portable mobile but also to ENE-FARM, a cogeneration system and the like and, therefore, contributes to the development of energy industry and environmental technology.

EXPLANATION OF NUMERALS

1 . . . cathode,
1A, 1B, 1C: gas diffusion electrode (ODE)
1c . . . catalytic layer (CL),
1m . . . water repellent layer (MPL),
1gd . . . gas diffusion layer (GDL),
2 . . . anode,
2c . . . catalytic layer (CL),
2m . . . water repellent layer (MPL),
2gd . . . gas diffusion layer (GDL),
3 . . . Polymer electrolyte membrane (PEM),
4, 5 . . . separator
10, 11 . . . membrane electrode assembly (MEA),
12, 13 . . . membrane catalyst layer assembly (CCM)
20, 20A . . . core-shell catalyst,
22 . . . carrier,
23, 23a . . . catalyst particle,
24 . . . core portion,
24s . . . core portion exposed surface, 26, 26a . . . shell portion,
30 . . . fuel cell stack,
P22 . . . mesopores of the carrier

The invention claimed is:

1. An electrode catalyst comprising a hollow carbon carrier having a mesopore of a pore size of 2 to 50 nm, and a catalyst particle supported on the carrier, wherein
the catalyst particle has a core portion formed on the carrier, and a shell portion formed so as to cover at least a part of the surface of the core portion,
Pd (0 valent) is included in the core portion,
Pt (0 valent) is included in the shell portion,
the catalyst particle is supported on both of inside and outside the mesopore of the carrier, and
a ratio of the catalyst particles supported inside the mesopore is 50% or more when an analysis of a particle size distribution of the catalyst particles is performed by using a three dimensional reconstructed image obtained by an electron beam tomography (electron tomography) measurement using an STEM (scanning transmission electron microscopy).

2. The electrode catalyst in accordance with claim 1, wherein
the ratio of the catalyst particles supported inside the mesopore is 50% or more when an analysis of a particle size distribution of the catalyst particles is performed by using a three dimensional reconstructed image obtained by an electron beam tomography (electron tomography) measurement using an STEM (scanning transmission electron microscopy).

3. The electrode catalyst in accordance with claim 1, wherein
the conditions of the following the formula (1) and the formula (2) are simultaneously satisfied when the analysis of the particle size distribution of the catalyst particles is performed by using three-dimensional reconstructed images obtained by electron beam tomography (electron tomography) measurement with an STEM (scanning transmission electron microscopy);

$$D1 < D2 \tag{1}$$

$$(N1/N2) > 1.0 \tag{2}$$

in the formula (1) and the formula (2),
D1 indicates a sphere equivalent diameter of particles exhibiting a maximum frequency among the catalyst particles supported inside the mesopores of the carrier,
D2 indicates a sphere equivalent diameter of particles exhibiting a maximum frequency among the catalyst particles supported outside the mesopores of the carrier,
N1 indicates a frequency of particles exhibiting a maximum frequency among the catalyst particles supported inside the mesopores of the carrier, and
N2 indicates a frequency of particles exhibiting a maximum frequency among the catalyst particles supported outside the mesopores of the carrier.

4. The electrode catalyst in accordance with claim 1, wherein
the core portion is composed of Pd (0 valent) and the shell portion is composed of Pt (0).

5. The electrode catalyst in accordance with claim 1, wherein
the hollow carbon carrier is Ketjen black EC300J.

6. The electrode catalyst in accordance with claim 5, wherein
the BET-specific surface area (nitrogen-adsorption specific surface area) of the hollow carbon carrier is 750 to 800 m²/g.

7. A composition for forming gas diffusion electrode comprising the electrode catalyst in accordance with claim 1.

8. A gas diffusion electrode comprising the electrode catalyst in accordance with claim 1.

9. A membrane electrode assembly (MEA) comprising the gas diffusion electrode in accordance with claim 8.

10. A fuel cell stack comprising the membrane electrode assembly (MEA) in accordance with claim 9.

* * * * *